United States Patent
Guo et al.

(10) Patent No.: US 10,833,834 B2
(45) Date of Patent: Nov. 10, 2020

(54) SIGNAL SENDING METHOD AND APPARATUS, AND SIGNAL RECEIVING METHOD AND APPARATUS

(71) Applicant: Huawei Technologies Co., Ltd., Shenzhen (CN)

(72) Inventors: Zhiheng Guo, Beijing (CN); Qian Wu, Beijing (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/573,358

(22) Filed: Sep. 17, 2019

(65) Prior Publication Data

US 2020/0014508 A1    Jan. 9, 2020

Related U.S. Application Data

(63) Continuation of application No. PCT/CN2018/103444, filed on Aug. 31, 2018.

(30) Foreign Application Priority Data

Sep. 8, 2017 (CN) .......................... 2017 1 0806271
Nov. 17, 2017 (CN) .......................... 2017 1 1143811
Feb. 14, 2018 (CN) .......................... 2018 1 0151929

(51) Int. Cl.
*H04L 5/00* (2006.01)
*H04J 1/02* (2006.01)
(Continued)

(52) U.S. Cl.
CPC .............. *H04L 5/0091* (2013.01); *H04B 7/12* (2013.01); *H04J 1/02* (2013.01); *H04L 5/001* (2013.01);
(Continued)

(58) Field of Classification Search
CPC .............. H04B 7/02–12; H04J 1/02–20; H04J 11/0069–0093; H04J 2011/0003–0096;
(Continued)

(56) References Cited

U.S. PATENT DOCUMENTS

2013/0114393 A1* 5/2013 Lee .......................... H04L 5/003
2014/0044064 A1 2/2014 Nangia et al.
(Continued)

FOREIGN PATENT DOCUMENTS

CN  101507222 A  8/2009
CN  102447662 A  5/2012
(Continued)

OTHER PUBLICATIONS

3rd Generation Partnership Project; Technical Specification Group Radio Access Network; NR; Physical channels and modulation (Release 15), 3GPP TS 38.211 V1.0.0, Sep. 2017, 37 pages.
(Continued)

*Primary Examiner* — Timothy J Weidner
(74) *Attorney, Agent, or Firm* — Slater Matsil, LLP

(57) ABSTRACT

Embodiments of this application provide a signal sending method, including: determining a first subcarrier, wherein an offset is between the first subcarrier and a center subcarrier of target resource blocks in a target bandwidth, and the offset is related to a subcarrier spacing; and determining a signal, wherein a location of the first subcarrier is the same as a carrier frequency location of the signal.

22 Claims, 10 Drawing Sheets

(51) Int. Cl.
*H04J 11/00* (2006.01)
*H04B 7/12* (2006.01)
*H04W 4/70* (2018.01)
*H04W 28/22* (2009.01)
*H04W 72/02* (2009.01)
*H04W 72/04* (2009.01)
*H04W 88/02* (2009.01)
*H04W 88/06* (2009.01)
*H04W 88/08* (2009.01)
*H04W 88/10* (2009.01)
*H04W 92/10* (2009.01)

(52) U.S. Cl.
CPC ............ *H04L 5/003* (2013.01); *H04L 5/0005* (2013.01); *H04L 5/0037* (2013.01); *H04L 5/0092* (2013.01); *H04L 5/0094* (2013.01); *H04W 4/70* (2018.02); *H04W 28/22* (2013.01); *H04W 72/02* (2013.01); *H04W 72/04* (2013.01); *H04W 72/044* (2013.01); *H04W 72/0453* (2013.01); *H04J 2011/0009* (2013.01); *H04J 2011/0016* (2013.01); *H04W 88/02* (2013.01); *H04W 88/06* (2013.01); *H04W 88/08* (2013.01); *H04W 88/10* (2013.01); *H04W 92/10* (2013.01)

(58) Field of Classification Search
CPC ............ H04L 5/0001–26; H04W 4/70; H04W 8/22–245; H04W 28/02–0263; H04W 28/06–085; H04W 36/0005–385; H04W 48/02–20; H04W 72/005–14; H04W 74/002–02; H04W 84/02–047; H04W 88/02–12; H04W 92/04; H04W 92/10
See application file for complete search history.

(56) References Cited

U.S. PATENT DOCUMENTS

| 2015/0365926 | A1 | 12/2015 | Long | |
| 2018/0124744 | A1* | 5/2018 | Xue | H04L 5/0048 |
| 2018/0176919 | A1* | 6/2018 | Takahashi | H04L 5/0094 |
| 2019/0028143 | A1* | 1/2019 | Zhang | H04L 5/0044 |
| 2019/0229867 | A1* | 7/2019 | Yi | H04L 5/0053 |
| 2019/0356524 | A1* | 11/2019 | Yi | H04L 5/0094 |
| 2019/0380098 | A1* | 12/2019 | Liu | H04L 5/0094 |

FOREIGN PATENT DOCUMENTS

| CN | 104254997 A | 12/2014 | |
| WO | WO-2018048187 A1 * | 3/2018 | H04L 5/0053 |

OTHER PUBLICATIONS

Panasonic, "Discussion on frequency domain frame structure for NR," 3GPP TSG RAN WG1 Meeting #87, R1-1611892, Reno, USA, Nov. 14-18, 2016, 5 pages.

ZTE, et al., "Implicit DC sub-carrier indication," 3GPP TSG RAN WG1 AH_NR Meeting, R1-1700266, Spokane, USA, Jan. 16-20, 2017, 5 pages.

Panasonic, et al., "WF on DC handling," 3GPP TSG RAN WG1 NR Ad-Hoc Meeting, R1-1701525, Spokane, USA, Jan. 16-20, 2017, 5 pages.

Huawei, "Way Forward on Spectral Utilization," 3GPP TSG-RAN WG4 NR#2, R4-1706929, Qingdao, China, May 27-29, 2017, 3 pages.

* cited by examiner

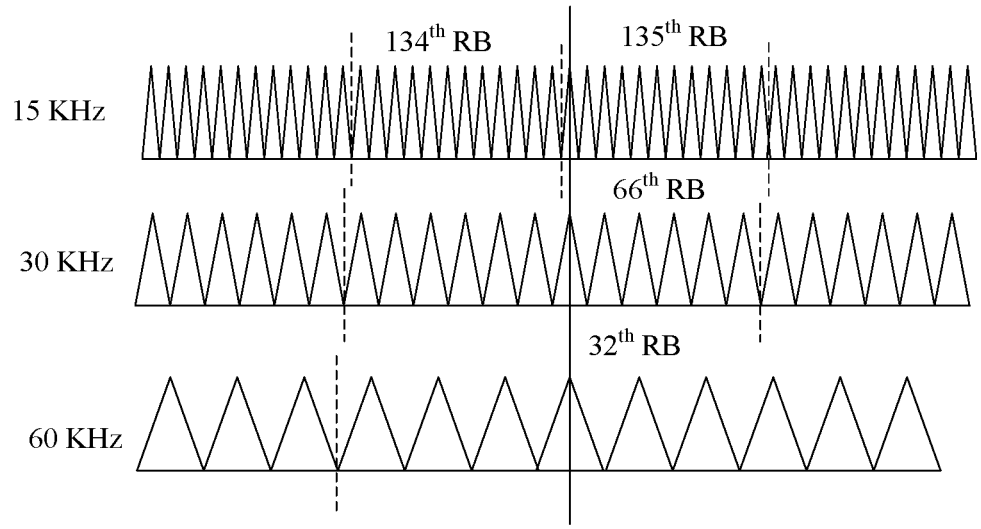

FIG. 7

```
301: A network device determines location information of a first
subcarrier based on a parameter
```

```
302: The network device determines a downlink signal based on
the location information of the first subcarrier
```

```
303: The network device sends the downlink signal to a terminal device
```

```
304: The terminal device determines the location information of
the first subcarrier based on the first parameter
```

```
305: The terminal device receives the downlink signal at a location
that corresponds to the location information of the first subcarrier
```

FIG. 8

SIGNAL SENDING METHOD AND APPARATUS, AND SIGNAL RECEIVING METHOD AND APPARATUS

CROSS-REFERENCE TO RELATED APPLICATIONS

This application is a continuation of International Application No. PCT/CN2018/103444, filed on Aug. 31, 2018, which claims priority to Chinese Patent Application No. 201810151929.2, filed on Feb. 14, 2018 and Chinese Patent Application No. 201711143811.7, filed on Nov. 17, 2017 and Chinese Patent Application No. 201710806271.X, filed on Sep. 8, 2017. The disclosures of the aforementioned applications are hereby incorporated by reference herein in their entireties.

TECHNICAL FIELD

Embodiments of this application relates to the field of wireless communications technologies, and specifically, to a signal sending method, a signal receiving method, and an apparatus.

BACKGROUND

During deployment of a wireless communications system, for example, a long term evolution (LTE) system and a 5G new radio (NR) system, a multiplexing technology of orthogonal frequency division multiple access is used. To be specific, a communication resource block in frequency domain is a frequency domain resource block (PRB), where one PRB includes 12 subcarriers. Currently, in an NR standard, a plurality of bandwidths and different subcarrier spacings are already defined. For example, as shown in Table 1, 5 MHz, 10 MHz, 15 MHz, and 20 MHz are bandwidths, and $N_{RB}$ is a quantity of target resource blocks.

TABLE 1

| Subcarrier spacing [kHz] | 5 MHz $N_{RB}$ | 10 MHz $N_{RB}$ | 15 MHz $N_{RB}$ | 20 MHz $N_{RB}$ |
|---|---|---|---|---|
| 15 | [25] | [52] | [79] | [106] |
| 30 | [11] | [24] | [38] | [51, 52] |
| 60 | N.A | [11, 12] | [18] | [24] |

For a specified bandwidth or a specified bandwidth part (BWP), each subcarrier spacing corresponds to a different quantity of PRBs, and a quantity of PRBs corresponding to a larger subcarrier spacing is less than a quantity of PRBs corresponding to a smaller subcarrier spacing. It should be noted that a bandwidth is not limited to the four values listed in Table 1, and may further be a value greater than 20 MHz such as 30 MHz or 50 MHz. A subcarrier spacing is not limited to the three values listed in Table 1 either, and may further be a value greater than 60 KHz such as 120 KHz.

When transmitting information, a sending device may select one from a plurality of subcarriers of a bandwidth as a direct current (DC) subcarrier. For example, according to Table 1, when a bandwidth is 5 MHz and a subcarrier spacing is 15 kHz, there is a total of 25 PRBs, and each PRB includes 12 subcarriers. Therefore, there are a total of 25×12=300 subcarriers, and the sending device selects one from the 300 subcarriers as a direct current subcarrier. It should be noted that the 300 subcarriers are usually numbered from 0 to 299, and either the subcarrier numbered as 149 or the subcarrier numbered as 150 may be referred to as a center subcarrier of the bandwidth. The sending device may send indication information to a receiving device, and the indication information is used to notify location information of the direct current subcarrier.

As described above, the receiving device obtains the location information of the direct current subcarrier used by the sending device to send a signal, so that the sending device can randomly select a subcarrier from the plurality of subcarriers as a direct current subcarrier. Therefore, in order that the receiving device can learn of the location information of the direct current subcarrier, the sending device needs to additionally send the indication information to the receiving device, and the indication information is used to notify the location information of the direct current subcarrier, thereby increasing signaling overheads.

SUMMARY

In view of this, embodiments of this application provide a signal sending method and a signal receiving method, to reduce additional signaling overheads sent by a sending device to a receiving device to indicate a direct current subcarrier.

According to a first aspect, an embodiment of this application provides a signal sending method, including: determining, by a terminal device, location information of a first subcarrier based on a first parameter, where the first parameter includes at least one of the following: a subcarrier spacing, a target bandwidth, or a quantity of target resource blocks; determining an uplink signal based on the location information of the first subcarrier; and sending the uplink signal to a network device. This solution can ensure receiving performance of receiving, by the network device, the uplink signal sent by the terminal device, and avoid or reduce additional signaling overheads sent by the terminal device to the network device to indicate a direct current subcarrier.

In an example, if the first parameter is the target bandwidth and the subcarrier spacing, the determining, by a terminal device, location information of a first subcarrier based on a first parameter includes: determining, by the terminal device, the location information of the first subcarrier based on the target bandwidth and the subcarrier spacing. In this solution, when the terminal device sends signals having different subcarrier spacings, a location of a carrier frequency or a radio frequency local oscillator can be aligned with a location of the first subcarrier, to obtain better receiving performance, for example, radio frequency performance.

In another example, if the first parameter is the quantity of target resource blocks, the determining, by a terminal device, location information of a first subcarrier based on a first parameter includes: determining, by the terminal device, the location information of the first subcarrier based on the quantity of target resource blocks. In this solution, for any value of a subcarrier spacing of a sending bandwidth, the first subcarrier determined by the terminal device is a center subcarrier of the sending bandwidth, so that when the terminal device sends signals having different subcarrier spacings, a location of a carrier frequency or a radio frequency local oscillator can be aligned with a location of the first subcarrier, to obtain relatively desirable receiving performance, for example, radio frequency performance.

In another example, the terminal device determines that a location of a second subcarrier corresponding to a second subcarrier spacing is the same as that of the first subcarrier, where the second subcarrier spacing is a subcarrier spacing other than a subcarrier spacing corresponding to the first subcarrier.

According to a second aspect, an embodiment of this application provides a signal receiving method, including: determining, by a network device, location information of a first subcarrier based on a first parameter, where the first parameter includes at least one of the following: a subcarrier spacing, a target bandwidth, or a quantity of target resource blocks; and receiving an uplink signal at a location of the first subcarrier that corresponds to the location information of the first subcarrier.

In an example, if the first parameter is the target bandwidth and the subcarrier spacing, the determining, by a network device, location information of a first subcarrier based on a first parameter includes: determining, by the network device, the location information of the first subcarrier based on the target bandwidth and the subcarrier spacing.

In another example, if the first parameter is the quantity of target resource blocks, the determining, by a network device, location information of a first subcarrier based on a first parameter includes: determining, by the network device, the location information of the first subcarrier based on the quantity of target resource blocks.

It should be particularly noted that for beneficial effects of the embodiment of the second aspect, refer to those of the embodiment of the first aspect. Details are not described herein again.

According to a third aspect, an embodiment of this application provides a terminal device. The terminal device has a function for implementing behavior of the terminal device in the foregoing method design. The function may be implemented by using hardware, or may be implemented by hardware executing corresponding software. The hardware or the software includes one or more modules corresponding to the foregoing function. The modules may be software and/or hardware.

In a possible design, the terminal device includes: a processor and a transmitter. The processor is configured to: determine location information of a first subcarrier based on a first parameter, and determine an uplink signal based on the location information of the first subcarrier, where the first parameter includes at least one of the following: a subcarrier spacing, a target bandwidth, or a quantity of target resource blocks. The transmitter is configured to send the uplink signal determined by the processor to a network device.

In an example, the processor is specifically configured to: if the first parameter is the target bandwidth and the subcarrier spacing, determine the location information of the first subcarrier based on the target bandwidth and the subcarrier spacing.

In another example, the processor is specifically configured to: if the first parameter is the quantity of target resource blocks, determine the location information of the first subcarrier based on the quantity of target resource blocks.

In another example, the processor is further configured to determine that a location of a second subcarrier corresponding to a second subcarrier spacing is the same as that of the first subcarrier, where the second subcarrier spacing is a subcarrier spacing other than a subcarrier spacing corresponding to the first subcarrier.

It should be particularly noted that for beneficial effects of the embodiment of the third aspect, refer to those of the embodiment of the first aspect. Details are not described herein again.

According to a fourth aspect, an embodiment of this application provides a network device. The network device has a function for performing behavior of the network device in the foregoing method design. The function may be implemented by using hardware, or may be implemented by hardware executing corresponding software. The hardware or the software includes one or more modules corresponding to the foregoing function.

In a possible design, the network device includes: a processor, configured to determine location information of a first subcarrier based on a first parameter, where the first parameter includes at least one of the following: a subcarrier spacing, a target bandwidth, or a quantity of target resource blocks; and a receiver, configured to receive an uplink signal at a location of the first subcarrier that corresponds to the location information of the first subcarrier determined by the processor.

In an example, the processor is specifically configured to: if the first parameter is the target bandwidth and the subcarrier spacing, determine the location information of the first subcarrier based on the target bandwidth and the subcarrier spacing.

In another example, the processor is specifically configured to: if the first parameter is the quantity of target resource blocks, determine the location information of the first subcarrier based on the quantity of target resource blocks.

It should be particularly noted that for beneficial effects of the embodiment of the fourth aspect, refer to those of the embodiment of the first aspect. Details are not described herein again.

According to a fifth aspect, an embodiment of this application provides a signal sending method, including: determining, by a network device, location information of a first subcarrier based on a first parameter, where the first parameter includes at least one of the following: a subcarrier spacing, a target bandwidth, or a quantity of target resource blocks; determining, by the network device, a downlink signal based on the location information of the first subcarrier; and sending, by the network device, the downlink signal to a terminal device. This solution can ensure receiving performance of receiving, by the terminal device, the downlink signal sent by the network device, and avoid additional signaling overheads sent by the network device to the terminal device to indicate a direct current subcarrier.

In an example, if the first parameter is the target bandwidth and the subcarrier spacing, the determining, by a network device, location information of a first subcarrier based on a first parameter includes: determining, by the network device, the location information of the first subcarrier based on the target bandwidth and the subcarrier spacing. In this solution, when the network device sends signals having different subcarrier spacings, a location of a carrier frequency or a radio frequency local oscillator can be aligned with a location of the first subcarrier, to obtain better radio frequency performance.

In another example, if the first parameter is the quantity of target resource blocks, the determining, by a network device, location information of a first subcarrier based on a first parameter includes: determining, by the network device, the location information of the first subcarrier based on the quantity of target resource blocks. In this solution, for any value of a subcarrier spacing of a sending bandwidth, the first subcarrier determined by the network device is a center subcarrier of the sending bandwidth, so that when the network device sends signals having different subcarrier spacings, a location of a carrier frequency or a radio frequency local oscillator can be aligned with a location of the first subcarrier, to obtain relatively desirable radio frequency performance.

In another example, the network device determines that a location of a second subcarrier corresponding to a second subcarrier spacing is the same as that of the first subcarrier, where the second subcarrier spacing is a subcarrier spacing other than a subcarrier spacing corresponding to the first subcarrier.

According to a sixth aspect, an embodiment of this application provides a signal receiving method, including: determining, by a terminal device, location information of a first subcarrier based on a first parameter, where the first parameter includes at least one of the following: a subcarrier spacing, a target bandwidth, or a quantity of target resource blocks; and receiving, by the terminal device, a downlink signal at a location that corresponds to the location information of the first subcarrier.

In an example, if the first parameter is the target bandwidth and the subcarrier spacing, the determining, by a terminal device, location information of a first subcarrier based on a first parameter includes: determining, by the terminal device, the location information of the first subcarrier based on the target bandwidth and the subcarrier spacing.

In another example, if the first parameter is the quantity of target resource blocks, the determining, by a terminal device, location information of a first subcarrier based on a first parameter includes: determining, by the terminal device, the location information of the first subcarrier based on the quantity of target resource blocks.

It should be particularly noted that for beneficial effects of the embodiment of the sixth aspect, refer to those of the embodiment of the fifth aspect. Details are not described herein again.

According to a seventh aspect, an embodiment of this application provides a network device. The network device has a function of implementing operations of the network device in the foregoing method design. The function may be implemented by using hardware, or may be implemented by hardware executing corresponding software. The hardware or the software includes one or more modules corresponding to the foregoing function.

In a possible design, the network device includes: a processor, configured to: determine location information of a first subcarrier based on a first parameter, and determine an downlink signal based on the location information of the first subcarrier, where the first parameter includes at least one of the following: a subcarrier spacing, a target bandwidth, or a quantity of target resource blocks; and a transmitter, configured to send the downlink signal determined by the processor to a terminal device.

In an example, the processor is specifically configured to: if the first parameter is the target bandwidth and the subcarrier spacing, determine the location information of the first subcarrier based on the target bandwidth and the subcarrier spacing.

In another example, the processor is specifically configured to: if the first parameter is the quantity of target resource blocks, determine the location information of the first subcarrier based on the quantity of target resource blocks.

In another example, the processor is further configured to determine that a location of a second subcarrier corresponding to a second subcarrier spacing is the same as that of the first subcarrier, where the second subcarrier spacing is a subcarrier spacing other than a subcarrier spacing corresponding to the first subcarrier.

It should be particularly noted that for beneficial effects of the embodiment of the seventh aspect, refer to those of the embodiment of the fifth aspect. Details are not described herein again.

According to an eighth aspect, an embodiment of this application provides a terminal device. The terminal device has a function for implementing behavior of the terminal device in the foregoing method design. The function may be implemented by using hardware, or may be implemented by hardware executing corresponding software. The hardware or the software includes one or more modules corresponding to the foregoing function. The modules may be software and/or hardware.

In a possible design, the terminal device includes: a processor, configured to determine location information of a first subcarrier based on a first parameter, where the first parameter includes at least one of the following: a subcarrier spacing, a target bandwidth, or a quantity of target resource blocks; and a receiver, configured to receive a downlink signal at a location of the first subcarrier that corresponds to the location information of the first subcarrier determined by the processor.

In an example, the processor is specifically configured to: if the first parameter is the target bandwidth and the subcarrier spacing, determine the location information of the first subcarrier based on the target bandwidth and the subcarrier spacing.

In another example, the processor is specifically configured to: if the first parameter is the quantity of target resource blocks, determine the location information of the first subcarrier based on the quantity of target resource blocks.

It should be particularly noted that for beneficial effects of the embodiment of the eighth aspect, refer to those of the embodiment of the fifth aspect. Details are not described herein again.

In the embodiments of the foregoing aspects, the target bandwidth includes: a sending bandwidth of the terminal device, or a maximum sending bandwidth supported by the terminal device.

In the embodiments of the foregoing aspects, the quantity of target resource blocks includes: a quantity of resource blocks corresponding to the maximum sending bandwidth supported by the terminal device, or a quantity of resource blocks corresponding to the maximum sending bandwidth supported by the network device; or a quantity of resource blocks corresponding to the sending bandwidth of the terminal device or a quantity of resource blocks corresponding to the sending bandwidth of the network device.

In the embodiments of the foregoing aspects, the first subcarrier is a center subcarrier corresponding to the target bandwidth and the subcarrier spacing.

In the embodiments of the foregoing aspects, the location information of the first subcarrier includes a number of the first subcarrier.

In the embodiments of the foregoing aspects, the number of the first subcarrier is a multiple of 6 and is not a multiple of 12, or is a multiple of 12.

According to a ninth aspect, an embodiment of this application provides a baseband chip, including a processor and a memory. The memory is configured to store a program instruction, and the processor executes the instruction to enable a network device to perform the steps of the first aspect. An information sending apparatus may be a baseband chip of the network device.

According to a tenth aspect, an embodiment of this application provides a baseband chip, including a processor and a memory. The memory is configured to store a program instruction, and the processor executes the instruction to enable a terminal device to perform the steps of the second aspect.

According to an eleventh aspect, an embodiment of this application provides a baseband chip, including a processor and a memory. The memory is configured to store a program instruction, and the processor executes the instruction to enable a network device to perform the steps of the fifth aspect. An information sending apparatus may be a baseband chip of the network device.

According to a twelfth aspect, an embodiment of this application provides a baseband chip, including a processor and a memory. The memory is configured to store a program instruction, and the processor executes the instruction to enable a terminal device to perform the steps of the sixth aspect.

According to a thirteenth aspect, an embodiment of this application provides a computer program product. The computer program product includes: computer program code. When the computer program code is run by a network device, the network device is enabled to perform the method according to the first aspect or any possible implementation of the first aspect.

According to a fourteenth aspect, an embodiment of this application provides a computer program product. The computer program product includes: computer program code. When the computer program code is run by a terminal device, the terminal device is enabled to perform the method according to the second aspect or any possible implementation of the second aspect.

According to a fifteenth aspect, an embodiment of this application provides a computer program product. The computer program product includes: computer program code. When the computer program code is run by a network device, the network device is enabled to perform the method according to the fifth aspect or any possible implementation of the fifth aspect.

According to a sixteenth aspect, an embodiment of this application provides a computer program product. The computer program product includes: computer program code. When the computer program code is run by a terminal device, the terminal device is enabled to perform the method according to the sixth aspect or any possible implementation of the sixth aspect.

According to a seventeenth aspect, an embodiment of this application provides a computer-readable medium. The computer-readable medium stores program code. The program code includes an instruction used to perform the method according to the first aspect or any possible implementation of the first aspect.

According to an eighteenth aspect, an embodiment of this application provides a computer-readable medium. The computer-readable medium stores program code. The program code includes an instruction used to perform the method according to the second aspect or any possible implementation of the second aspect.

According to a nineteenth aspect, an embodiment of this application provides a computer-readable medium. The computer-readable medium stores program code. The program code includes an instruction used to perform the method according to the fifth aspect or any possible implementation of the fifth aspect.

According to a twentieth aspect, an embodiment of this application provides a computer-readable medium. The computer-readable medium stores program code. The program code includes an instruction used to perform the method according to the sixth aspect or any possible implementation of the sixth aspect.

BRIEF DESCRIPTION OF THE DRAWINGS

FIG. 7 is other schematic diagrams of numbers of a first subcarrier that respectively correspond to subcarrier spacings 15 kHz, 30 kHz, and 60 kHz;

FIG. 8, FIG. 8a, FIG. 8b and FIG. 8c show another implementation according to an embodiment of this application;

DETAILED DESCRIPTION OF ILLUSTRATIVE EMBODIMENTS

Figure 1:
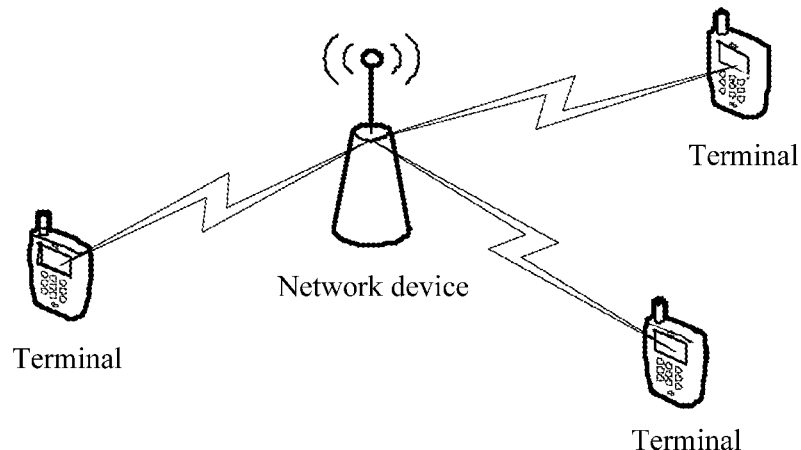
FIG. 1 is an architectural diagram of a system to which a signal sending method and a signal receiving method are applied according to this application.

The following describes technical solutions of this application with reference to the accompanying drawings.

It should be understood that division of manners, cases, and types in the embodiments of this application are only for ease of description and shall constitute no particular limitation, and features of various manners, types, and cases may be combined with each other when the features are not mutually exclusive.

A method in the embodiments of this application may be applied to a new radio (NR) communications system, a long term evolution (LTE) system, or a long term evolution-advanced (LTE-A) system, or may be extended to a similar wireless communications system such as a cellular system related to the 3rd Generation Partnership Project (3GPP).

In the embodiments of the present disclosure, for uplink, a receiving device may be a network device and a sending device may be a terminal device; or for downlink, a receiving device may be a terminal device and a sending device may be a network device. For convenience of description, a terminal device and a network device are described in the following embodiments.

In the embodiments of this application, the network device is an apparatus deployed in a radio access network to provide a wireless communication function for the terminal device. The network device may include base stations in various forms, including a macro base station, a micro base station (also referred to as a small cell), a relay station, an access point, and the like. In systems using different radio access technologies, devices having a network access function may have different names. For example, the network device may be a network device such as a gNB or a TRP in a 5G system or a network device in a future evolved public land mobile network (PLMN) system, may be an access point (AP) in a wireless local area network (WLAN), or may be an evolved NodeB (eNodeB) in an LTE system or an LTE-A system or a NodeB (Node B) in a third-generation (3G) system. In addition, the network device may also be an in-vehicle device or a wearable device.

The terminal device in the embodiments of this application is a device that may provide voice and/or data connectivity for a user, and may be a device accessing the 5G system by using a network device such as a gNB or a TRP in the system, may be a terminal device in the future evolved PLMN network, or may be a terminal device in the WLAN, the LTE system, the LTE-A system, or the 3G system. The terminal device may also be referred to as user equipment (UE), an access terminal, a terminal device unit, a terminal device station, a mobile station (MS), a remote station, a remote terminal, a mobile device, a user terminal, a terminal, a wireless communications device, a terminal device agent, or a terminal device apparatus. The terminal device may include various handheld devices, in-vehicle devices, wearable devices, and computing devices having a wireless communication function or other processing devices connected to a wireless modem, or may include a subscriber unit, a cellular phone, a smartphone, a wireless data card, a personal digital assistant (PDA) computer, a tablet computer, a wireless modem, a handheld device (handset), a laptop computer, a machine type communication (MTC) terminal, and a station (ST) in a wireless local area network (WLAN), or may be a cellular phone, a cordless phone, a session initiation protocol (SIP) phone, a wireless local loop (WLL) station, and the like.

A 5G NR system is used as an example. FIG. 1 is an architectural diagram of a system to which a signal sending method and a signal receiving method are applied according to this application. As shown in FIG. 1, the system includes a network device and at least one terminal device. The network device and the terminal device work in a 5G NR communications system, and the terminal device may communicate with the network device by using the 5G NR communications system.

Figure 2:
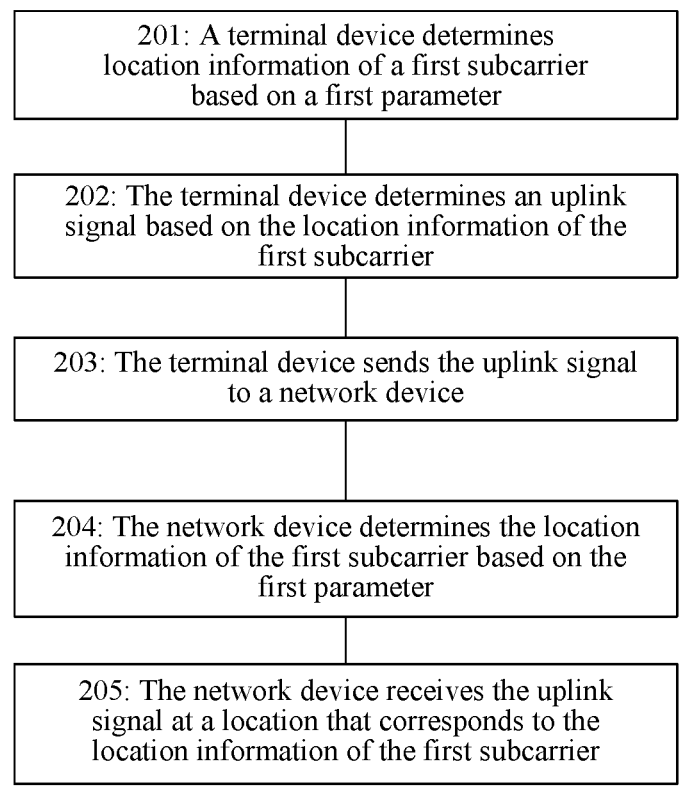
FIG. 2, FIG. 2a, FIG. 2b and FIG. 2c show an implementation according to an embodiment of this application.

As shown in FIG. 2, an embodiment of this application provides an implementation, including the following steps.

Step 201: A terminal device determines location information of a first subcarrier based on a first parameter, where the first parameter includes at least one of the following: a subcarrier spacing, a target bandwidth, or a quantity of target resource blocks.

In an example, the first subcarrier may be a direct current subcarrier.

For example, the direct current subcarrier is a subcarrier whose frequency is 0 in a baseband signal generated by the terminal device, and the frequency should be understood as a baseband frequency.

In an example, the first subcarrier is a center subcarrier corresponding to the target bandwidth and the subcarrier spacing.

In an example, the location information of the first subcarrier may include a number of the first subcarrier. For example, the number of the first subcarrier is a multiple of 6 and is not a multiple of 12, or is a multiple of 12.

For example, the location information of the first subcarrier may further have other representation forms than a number. The representation forms are not listed one by one herein and all fall within the protection scope of the present disclosure as long as the other representation forms can indicate the location information of the first subcarrier.

In an example, the target bandwidth may be a sending bandwidth of the terminal device. For example, the target bandwidth may be a bandwidth used to send uplink information, for example, 5 MHz, 10 MHz, or 20 MHz.

In an example, the target bandwidth may be configured by a network device for the terminal device, or may be determined by the terminal device.

In an example, the target bandwidth may be a maximum sending bandwidth that can be supported by the terminal device.

For example, the maximum sending bandwidth may be a parameter depending on a capability of the terminal device, and different terminal devices may have different maximum sending bandwidths. Certainly, the maximum sending bandwidth may also be a fixed value determined in advance, and maximum sending bandwidths that can be supported by the terminal device are the same.

In an example, the maximum sending bandwidth supported by the terminal device is related to the capability of the terminal device.

For example, when the maximum sending bandwidth supported by the terminal device is 20 MHz, the terminal device may send an uplink signal by using a sending bandwidth less than or equal to 20 MHz.

In an example, if the first parameter is the target bandwidth and the subcarrier spacing, the terminal device determines the location information of the first subcarrier based on the target bandwidth and the subcarrier spacing.

For example, the terminal device may determine the location information of the first subcarrier based on a correspondence between a location of the first subcarrier, the sending bandwidth, and the subcarrier spacing, and the location information of the first subcarrier may include a number of the first subcarrier in subcarriers of the maximum sending bandwidth. Specifically, the terminal device may maintain a table of the correspondence between the location of the first subcarrier, the sending bandwidth, and the subcarrier spacing. The location of the first subcarrier is a number k of the first subcarrier. As shown in Table 2, Table 2 is a table of a correspondence between the number k of the first subcarrier, the sending bandwidth, and the subcarrier spacing. When the sending bandwidth of the terminal device is 15 MHz and the subcarrier spacing is 15 KHz, the terminal device directly determines that the number k of the first subcarrier is 474, that is, the first subcarrier is a subcarrier numbered 474 in the sending bandwidth.

TABLE 2

| Subcarrier spacing | 10 MHz bandwidth | 15 MHz bandwidth |
|---|---|---|
| 15 kHz | K = 312 | K = 474 |
| 30 kHz | K = 144 | K = 328 |
| 60 kHz | K = 66 | K = 108 |

It should be noted that in the embodiment shown in Table 2, for any value of the subcarrier spacing in the sending bandwidth, the first subcarrier determined by the terminal device is a center subcarrier of the sending bandwidth. Therefore, when the terminal device sends signals having different subcarrier spacings, a location of a carrier frequency or a radio frequency local oscillator can be aligned with the location of the first subcarrier, to obtain relatively desirable radio frequency performance.

It should be particularly noted that, Table 2 is only an example for understanding this embodiment of the present disclosure. In an aspect, the content included in Table 2 includes but is not limited to the foregoing content. For example, a bandwidth value may include only one of 10 MHz and 15 MHz, or may include a bandwidth value other than 10 MHz and 15 MHz, and the subcarrier spacing may be other values. In another aspect, the correspondence between the number k of the first subcarrier, the sending bandwidth, and the subcarrier spacing in Table 2 may further have another representation form, and the another representation form falls within the protection scope of the present disclosure as long as the correspondence between the number k of the first subcarrier, the sending bandwidth, and the subcarrier spacing can be indicated. Details are not described herein.

For another example, the terminal device first determines a first offset $k_0$ based on a correspondence between the sending bandwidth, the subcarrier spacing, and the first offset $k_0$. The first offset $k_0$ is a difference between a number k of the first subcarrier and a number of a center subcarrier of the sending bandwidth. A value of $k_0$ may be an integer or may be a decimal. The value of $k_0$ may be related to the subcarrier spacing of the first subcarrier, that is, different subcarrier spacings correspond to different $k_0$; or the value of $k_0$ may be unrelated to the subcarrier spacing of the first subcarrier, that is, different subcarrier spacings correspond to same $k_0$. Specifically, the terminal device may maintain a table of the correspondence between the first offset $k_0$, the sending bandwidth, and the subcarrier spacing. As shown in Table 3, Table 3 is a table of the correspondence between the first offset $k_0$, the sending bandwidth, and the subcarrier spacing. When the sending bandwidth of the terminal device is 15 MHz and the subcarrier spacing is 15 KHz, the first offset $k_0$ determined by the terminal device is −6. Because the terminal device has 948 subcarriers in the sending bandwidth 15 MHz, the number of the center subcarrier of the terminal device is 474. Therefore, it is determined that the number k of the first subcarrier is 474−(−6)=480.

TABLE 3

| Subcarrier spacing | 10 MHz bandwidth | 15 MHz bandwidth |
|---|---|---|
| 15 kHz | $k_0 = 0$ | $k_0 = -6$ |
| 30 kHz | $k_0 = 0$ | $k_0 = 0$ |
| 60 kHz | $k_0 = 0$ | $k_0 = 0$ |

It should be noted that in this embodiment, for any subcarrier spacing of the sending bandwidth, a difference between the number of the first subcarrier that is determined by the terminal device and the number of the center subcarrier of the sending bandwidth is 0 or 6. In this solution, when the terminal device sends signals having different subcarrier spacings, a location of a carrier frequency or a radio frequency local oscillator can be aligned with a location of the first subcarrier, to obtain relatively desirable radio frequency performance.

It should be particularly noted that, Table 3 is only an example for understanding this embodiment of the present disclosure. In an aspect, the content included in Table 3 includes but is not limited to the foregoing content. For example, a bandwidth value may include only 10 MHz or 15 MHz, or may include a bandwidth value other than 10 MHz or 15 MHz, and the subcarrier spacing may be other values. In another aspect, the correspondence between the first offset $k_0$ and the sending bandwidth and the subcarrier spacing in Table 3 may further have another representation form, and the another representation form falls within the protection scope of the present disclosure as long as the correspondence between the first offset $k_0$, the sending bandwidth, and the subcarrier spacing can be indicated. Details are not described herein.

For another example, the terminal device determines the location information of the first subcarrier based on a correspondence between a location of the first subcarrier, the maximum sending bandwidth, and the subcarrier spacing, and the location information of the first subcarrier includes a number of the first subcarrier in subcarriers of the maximum sending bandwidth. Specifically, the terminal device may maintain a table of the correspondence between the number of the first subcarrier, the maximum sending bandwidth, and the subcarrier spacing. As shown in Table 4, Table 4 is a table of the relationship between the number k of the first subcarrier, the maximum sending bandwidth, and the subcarrier spacing. The maximum sending bandwidth supported by the terminal device is 50 MHz. When the subcarrier spacing is 15 KHz, the terminal device directly determines that the number k of the first subcarrier is 1620. When the subcarrier spacing is 30 KHz, the terminal device determines that the number k of the first subcarrier is 798. When the subcarrier spacing is 60 KHz, the terminal device determines that the number k of the first subcarrier is 390.

TABLE 4

| Subcarrier spacing | Maximum sending bandwidth of 50 MHz |
|---|---|
| 15 KHz | K = 1620 |
| 30 KHz | K = 798 |
| 60 KHz | K = 390 |

In the embodiment shown in Table 4, for any value of the subcarrier spacing in the maximum sending bandwidth, the first subcarrier determined by the terminal device is a center subcarrier of the sending bandwidth. In this solution, when the terminal device sends signals having different subcarrier spacings, a location of a carrier frequency or a radio frequency local oscillator can be aligned with the location of the first subcarrier, to obtain relatively desirable radio frequency performance.

It should be particularly noted that, Table 4 is only an example for understanding this embodiment of the present disclosure. In an aspect, the content included in Table 4 includes but is not limited to the foregoing content. In another aspect, the correspondence between the number k of the first subcarrier, the maximum sending bandwidth, and the subcarrier spacing in Table 4 may further have another representation form, and the another representation form falls within the protection scope of the present disclosure as long as the correspondence between the number k of the first subcarrier, the maximum sending bandwidth, and the subcarrier spacing can be indicated. Details are not described herein.

For another example, the terminal device first determines a first offset based on a correspondence between the maximum sending bandwidth, the subcarrier spacing, and the first offset. The first offset $k_0$ is a difference between a number k of the first subcarrier and a number of a center subcarrier of the sending bandwidth. Specifically, the terminal device may maintain a table of the correspondence between the first offset $k_0$, the maximum sending bandwidth, and the subcarrier spacing. As shown in Table 5, the maximum sending bandwidth supported by the terminal device is 50 MHz. When the subcarrier spacing is 15 KHz, the first offset $k_0$ determined by the terminal device is 0. Because the terminal device has 3240 subcarriers in the sending bandwidth 50 MHz, the number of the center subcarrier of the terminal device is 1620. Therefore, it is determined that the number k of the first subcarrier is 1620−0=1620.

TABLE 5

| Subcarrier spacing | Maximum sending bandwidth of 50 MHz |
|---|---|
| 15 kHz | $k_0 = 0$ |
| 30 kHz | $k_0 = 6$ |
| 60 kHz | $k_0 = 0$ |

It should be noted that in the example in Table 5, the first subcarrier determined by the terminal device is the center subcarrier of the maximum sending bandwidth supported by the terminal device. For any subcarrier spacing of the maximum sending bandwidth, a difference between the number of the first subcarrier that is determined by the terminal device and the number of the center subcarrier of the sending bandwidth is 0 or 6. In this solution, when the terminal device sends signals having different subcarrier spacings, a location of a carrier frequency or a radio frequency local oscillator can be aligned with a location of the first subcarrier, to obtain relatively desirable radio frequency performance.

It should be particularly noted that, Table 5 is only an example for understanding this embodiment of the present disclosure. In an aspect, the content included in Table 5 includes but is not limited to the foregoing content. In another aspect, the correspondence between the first offset $k_0$, the maximum sending bandwidth, and the subcarrier spacing in Table 5 may further have another representation form, and the another representation form falls within the protection scope of the present disclosure as long as the correspondence between the first offset $k_0$, the maximum sending bandwidth, and the subcarrier spacing can be indicated. Details are not described herein.

In an example, the quantity of target resource blocks includes a quantity of resource blocks corresponding to the sending bandwidth of the terminal device. It should be understood that, the quantity of resource blocks is related to the sending bandwidth of the terminal device and the subcarrier spacing used by the terminal device to send a signal. The terminal device may determine the quantity of target resource blocks based on the sending bandwidth and the subcarrier spacing.

In an example, the quantity of target resource blocks includes a quantity of resource blocks corresponding to the maximum sending bandwidth supported by the terminal device.

In another example, the first parameter is the quantity of target resource blocks, and the terminal device determines the location information of the first subcarrier based on the quantity of target resource blocks.

The location information of the first subcarrier may be the number k of the first subcarrier.

The number of the first subcarrier and the quantity of target resource blocks may satisfy any one of the following formulas:

$$k=\text{floor}(N_{RB}*M/2) \quad \text{(formula 1); or}$$

$$k=\text{floor}(N_{RB}*M/2)-k_0 \quad \text{(formula 2); or}$$

$$k=\text{floor}(N*12/2/2^{\wedge}(u_{max}-u_{min}))*2^{\wedge}(u_{max}-u_{min}) \quad \text{(3); or}$$

$$k=\text{floor}(N*12/2/2^{\wedge}(u_{max}-u_{min}))*2^{\wedge}(u_{max}-u_{min})+2^{\wedge}(u_{max}-u_{min}) \quad \text{(4); or}$$

$$k=\text{ceil}(N*12/2/2^{\wedge}(u_{max}-u_{min})*2^{\wedge}(u_{max}-u_{min}) \quad \text{(5).}$$

For values of parameters in the formulas, refer to the following specific embodiments.

Specifically, calculation of the foregoing formulas may be directly based on the first parameter, and a table may be maintained to store a calculation result.

It should be noted that the terminal device needs to determine the quantity of target resource blocks in advance. For example, the terminal device may determine the quantity of target resource blocks based on a correspondence between the quantity of target resource blocks, the target bandwidth, and the subcarrier spacing. According to Table 1, when the target bandwidth is 15 MHz, it may be determined that the quantity of target resource blocks corresponding to the subcarrier spacing 15 kHz is 79, the quantity of target resource blocks corresponding to the subcarrier spacing 30 kHz is 38, and the quantity of target resource blocks corresponding to the subcarrier spacing 60 kHz is 18.

After determining the quantity of target resource blocks, the terminal device may determine the location information of the first subcarrier based on the quantity of target resource blocks.

The location information of the first subcarrier may be the number k of the first subcarrier.

For example, the terminal device may determine the number k of the first subcarrier according to the formula 1:

$$K=\text{floor}(N_{RB}*M/2) \quad \text{(formula 1).}$$

$N_{RB}$ is the quantity of target resource blocks that is determined by the terminal device, and M is a quantity of subcarriers in a resource block, for example, M=12.

Figure 3:
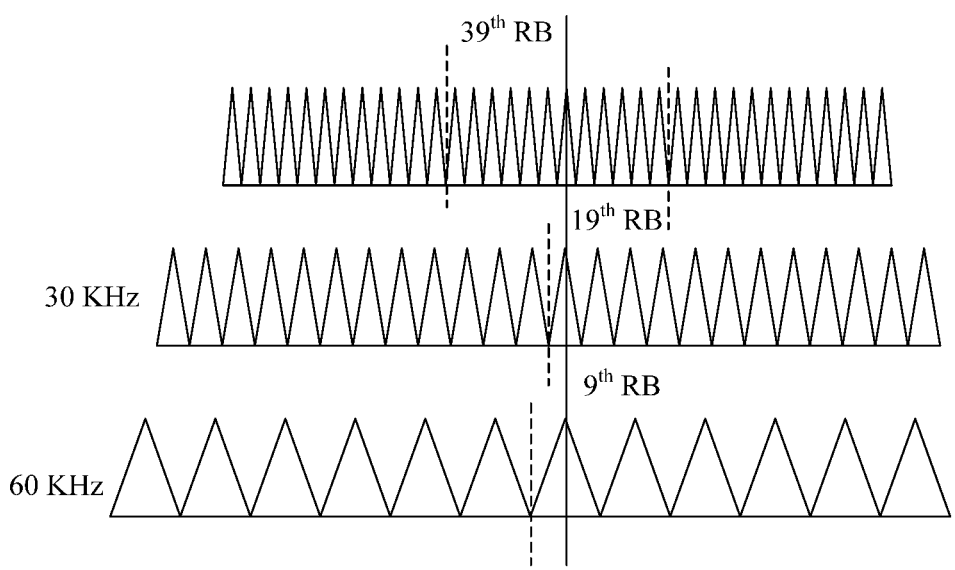
FIG. 3 is schematic diagrams of numbers of a first subcarrier that respectively correspond to subcarrier spacings 15 kHz, 30 kHz, and 60 kHz.

When $N_{RB}=79$, the terminal device determines that the number k of the first subcarrier is 474. When $N_{RB}=38$, the terminal device determines that the number k of the first subcarrier is 228. When $N_{RB}=18$, the terminal device determines that the number k of the first subcarrier is 108. FIG. 3 is schematic diagrams of numbers of the first subcarrier that respectively correspond to subcarrier spacings 15 kHz, 30 kHz, and 60 kHz. A dashed vertical line indicates a demarcation point of different RBs, and a solid vertical line is the carrier corresponding to the number of the first subcarrier. As can be learned, in the example of FIG. 3, for any subcarrier spacing, the first subcarrier determined by the terminal device is the center subcarrier of the target bandwidth. For any value of the subcarrier spacing in the sending bandwidth, the first subcarrier determined by the terminal device is a center subcarrier of the sending bandwidth. In this solution, when the terminal device sends signals having different subcarrier spacings, a location of a carrier frequency/a radio frequency local oscillator can be aligned with the location of the first subcarrier, to obtain relatively desirable radio frequency performance.

For another example, the terminal device may further determine the number k of the first subcarrier according to the formula 2:

$$k=\text{floor}(N_{RB}*M/2)-k_0 \qquad \text{(formula 2).}$$

$N_{RB}$ is the quantity of target resource blocks that is determined by the terminal device, M is a quantity of subcarriers in a resource block, for example, M=12, and $k_0$ is a parameter determined by the terminal device in advance. For example, a value of $k_0$ may be an integer or a decimal. The value of $k_0$ may be related to the subcarrier spacing of the first subcarrier, that is, different subcarrier spacings correspond to different $k_0$; or the value of $k_0$ may be unrelated to the subcarrier spacing of the first subcarrier, that is, different subcarrier spacings correspond to same $k_0$.

Specifically, the terminal device may first determine the value of $k_0$, and determine a value of the number k of the first subcarrier based on the value of $k_0$. For example, the terminal device determines that $k_0$ is 0. In this case, when $N_{RB}$=79, a number of the center subcarrier is 474, the terminal device determines that the number k of the first subcarrier is 474. Alternatively, the terminal device determines that $k_0$ is 3. In this case, when $N_{RB}$=38, a number of the center subcarrier is 228, and the terminal device determines that the number k of the first subcarrier is 228−3=225. Alternatively, the terminal device determines that $k_0$ is 1.5. In this case, when $N_{RB}$=18, a number of the center subcarrier is 108, and the terminal device determines that the number k of the first subcarrier is 108−1.5=106.5. It should be noted that k=106.5 should be understood as that the location of the first subcarrier that is determined by the terminal device is a middle location of two subcarriers, that is, a middle location of a subcarrier numbered 106 and a subcarrier numbered 107, instead of a peak location of a subcarrier.

Figure 4:
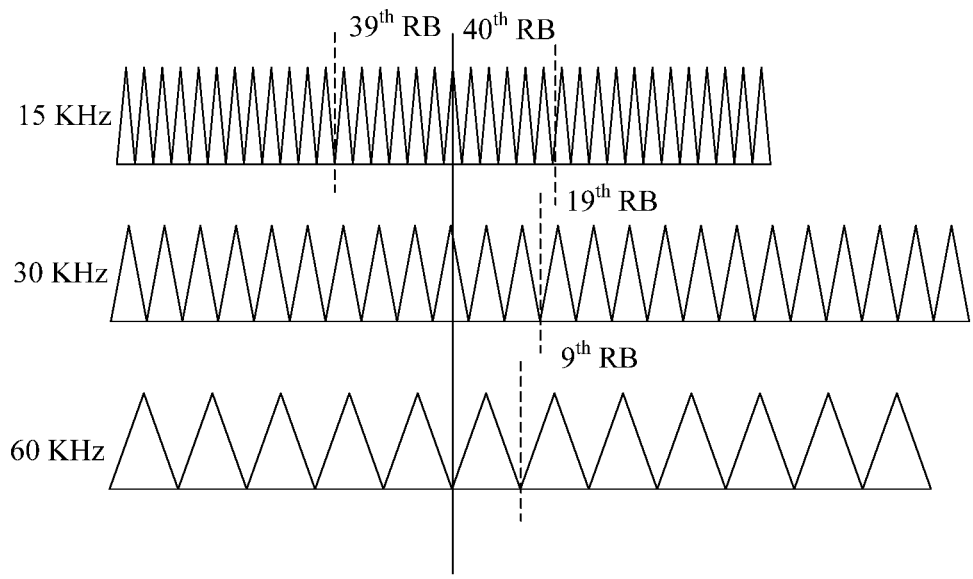
FIG. 4 is other schematic diagrams of numbers of a first subcarrier that respectively correspond to subcarrier spacings 15 kHz, 30 kHz, and 60 kHz.

FIG. 4 is schematic diagrams of numbers of the first subcarrier that respectively correspond to subcarrier spacings 15 kHz, 30 kHz, and 60 kHz. A dashed vertical line indicates a demarcation point of different RBs, and a solid vertical line is the carrier corresponding to the number of the first subcarrier. As can be learned, for the subcarrier spacings 15 kHz and 30 kHz, the location of the first subcarrier that is determined by the terminal device is a peak location of a subcarrier, but for the subcarrier spacing 60 kHz, the location of the first subcarrier that is determined by the terminal device is not a peak location of a subcarrier. It may be understood that in this embodiment, a minimum subcarrier spacing supported by the terminal device is 15 kHz, and a maximum subcarrier spacing supported by the terminal device is 60 kHz. The terminal device determines that the first subcarrier corresponding to the minimum subcarrier spacing is a center subcarrier. For another subcarrier spacing, the location of the first subcarrier that is determined by the terminal device is the same as the location of the first subcarrier that corresponds to the minimum subcarrier spacing. It should be particularly noted that the location of the first subcarrier includes a peak of a subcarrier, also includes a middle location of two subcarriers, and certainly may also be another possible location.

It should be noted that in the example shown in Table 4, for any value of the subcarrier spacing in the sending bandwidth, the location of the first subcarrier determined by the terminal device is a center location of the sending bandwidth. Although for a subcarrier spacing, the location of the first subcarrier is not a peak location of a subcarrier, when the terminal device sends signals having different subcarrier spacings, a location of a carrier frequency or a radio frequency local oscillator can be aligned with the location of the first subcarrier, to obtain relatively desirable radio frequency performance.

Figure 5:
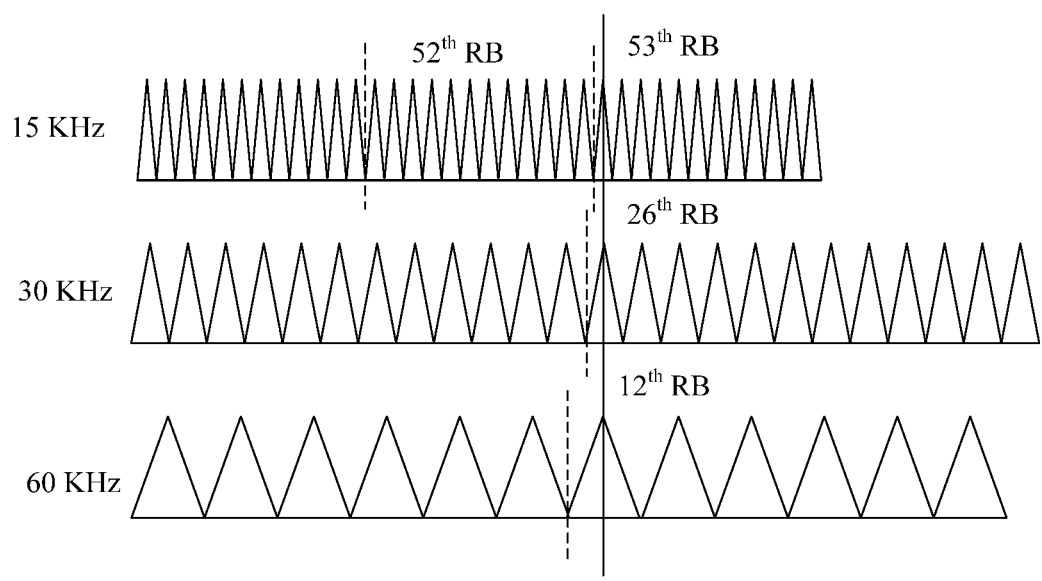
FIG. 5 is other schematic diagrams of numbers of a first subcarrier that respectively correspond to subcarrier spacings 15 kHz, 30 kHz, and 60 kHz.

For another example, the terminal device determines that $k_0$ is −6. In this case, when $N_{RB}$=79, a number of the center subcarrier is 474, and the terminal device determines that the number k of the first subcarrier is 474−(−6)=480. Alternatively, the terminal device determines that $k_0$ is 0. In this case, when $N_{RB}$=38, a number of the center subcarrier is 228, and the terminal device determines that the number k of the first subcarrier is 228. Alternatively, when $N_{RB}$=18, a number of the center subcarrier is 108, and the terminal device determines that the number k of the first subcarrier is 108. FIG. 5 is schematic diagrams of numbers of the first subcarrier that respectively correspond to subcarrier spacings 15 kHz, 30 kHz, and 60 kHz. A dashed vertical line indicates a demarcation point of different RBs, and a solid vertical line is the carrier corresponding to the number of the first subcarrier. As can be seen from FIG. 5, for any subcarrier spacing, the first subcarrier determined by the terminal device is a subcarrier ranking first in a resource block, or may be understood as a subcarrier numbered 0 in the resource block. In consideration that a resource block has 12 subcarriers and the subcarriers in a target resource block are increasingly numbered from 0, the number of the first subcarrier determined herein is a multiple of 12. If the subcarriers are increasingly numbered from 1, the number of the first subcarrier determined herein may be indicated as 12×m+1, where m is an integer. In the example shown in FIG. 5, although for a subcarrier spacing, the location of the first subcarrier that is determined by the terminal device is not a center location of the sending bandwidth, for any value of the subcarrier spacing in the sending bandwidth, the location of the first subcarrier that is determined by the terminal device is a peak location of a subcarrier. In addition, when the terminal device sends signals having different subcarrier spacings, a location of a carrier frequency or a radio frequency local oscillator can be aligned with the location of the first subcarrier, thereby reducing complexity of generating a signal by the terminal device.

It should be particularly noted that in the foregoing manner, the value of $k_0$ may be stipulated in a protocol, or may be obtained based on a correspondence between $k_0$, the target bandwidth, and the subcarrier spacing that is maintained in advance by the network device and the terminal device, for example, obtained from a table of the correspondence between $k_0$, the target bandwidth, and the subcarrier spacing, or obtained based on a correspondence between $k_0$ and the quantity of target resource blocks, for example, obtained from a table of the correspondence between $k_0$ and the quantity of target resource blocks.

Figure 6:
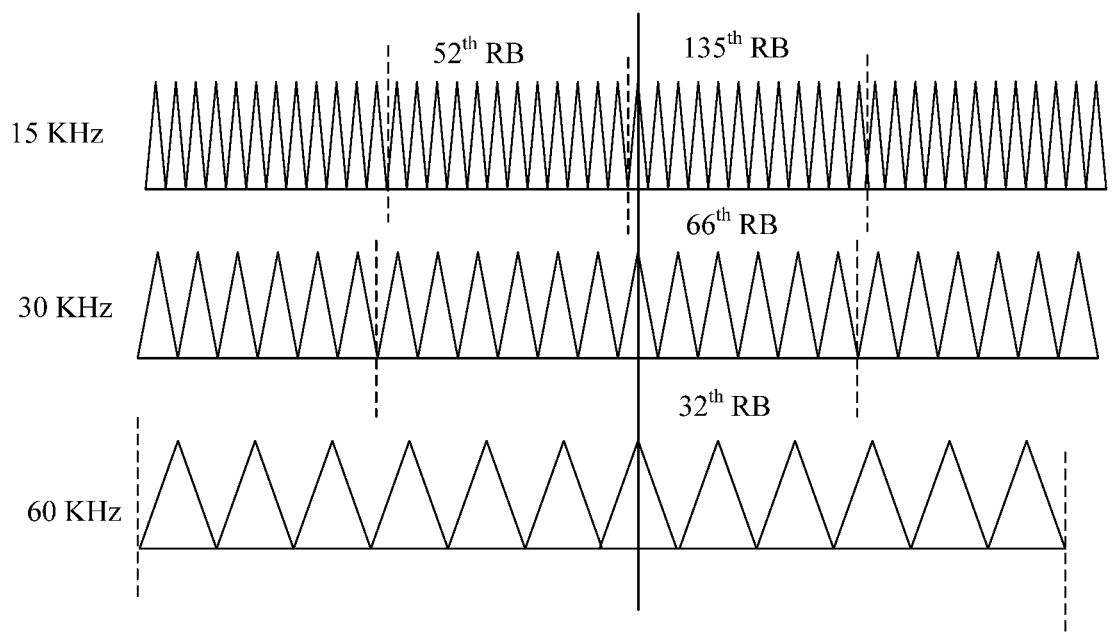
FIG. 6 is other schematic diagrams of numbers of a first subcarrier that respectively correspond to subcarrier spacings 15 kHz, 30 kHz, and 60 kHz.

For another example, the bandwidth is 20 MHz, the quantity of target resource blocks corresponding to the subcarrier spacing 15 kHz is 106, the quantity of target resource blocks corresponding to the subcarrier spacing 30 kHz is 52, and the quantity of target resource blocks corresponding to the subcarrier spacing 60 kHz is 24. It is determined, according to the formula 1, that k corresponding to the subcarrier spacing 15 kHz is 636, k corresponding to the subcarrier spacing 30 kHz is 312, and k corresponding to the subcarrier spacing 60 kHz is 144. Schematic diagrams of numbers of the first subcarrier respectively corresponding to the subcarrier spacings 15 kHz, 30 kHz, and 60 kHz are shown in FIG. 6.

It should be noted that in an example in which the bandwidth is 20 MHz, when the number k of the first subcarrier is determined according to the formula 2, the same first subcarrier may also be determined. In this case, for all subcarrier spacings, $k_0=0$.

Figure 5A:
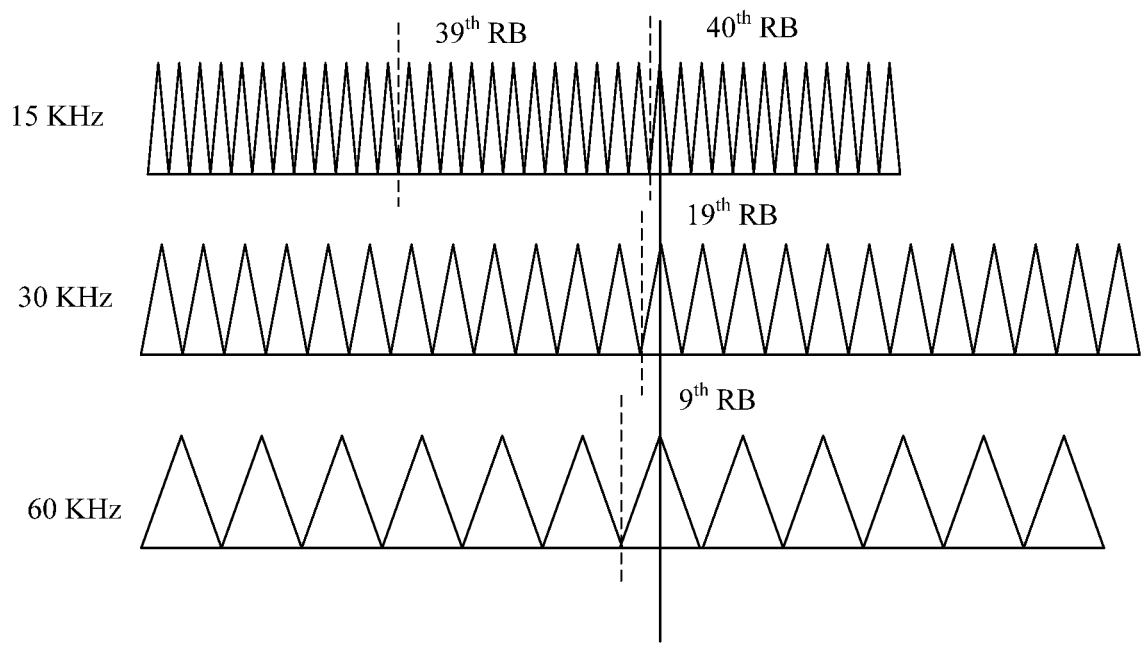
FIG. 5a is other schematic diagrams of numbers of a first subcarrier that respectively correspond to subcarrier spacings 15 kHz, 30 kHz, and 60 kHz.

For another example, when the target bandwidth is a maximum bandwidth that can be supported by the terminal device, the terminal device may first determine that the quantity of target resource blocks is 270, and the terminal device may determine, according to the formula 1, that the subcarrier spacing 15 kHz corresponds to k=1620. Alternatively, the terminal device determines that the quantity of target resource blocks is 133, and the terminal device may determine, according to the formula 1, that the subcarrier spacing 30 kHz corresponds to k=798. Alternatively, the terminal device determines that the quantity of target resource blocks is 65, and the terminal device may determine, according to the formula 1, that the subcarrier spacing 60 kHz corresponds to k=390. FIG. 5a is schematic diagrams of numbers of the first subcarrier that respectively correspond to subcarrier spacings 15 kHz, 30 kHz, and 60 kHz. A dashed vertical line indicates a demarcation point of different RBs, and a solid vertical line is the carrier corresponding to the number of the first subcarrier.

For another example, when the target bandwidth is a maximum bandwidth that can be supported by the terminal device, the quantity of target resource blocks corresponding to the subcarrier spacing 15 kHz is 270, the quantity of target resource blocks corresponding to the subcarrier spacing 30 kHz is 133, and the quantity of target resource blocks corresponding to the subcarrier spacing 60 kHz is 65. When the number k of the first subcarrier is determined according to the formula 2, the subcarrier spacing 15 kHz corresponds to $k_0=0$, the subcarrier spacing 30 kHz corresponds to $k_0=0$, the subcarrier spacing 60 kHz corresponds to $k_0=2$. The numbers of the first subcarrier respectively corresponding to the subcarrier spacings 15 kHz, 30 kHz, and 60 kHz are shown in FIG. 7.

In the embodiments shown in FIG. 3 to FIG. 7, an $X^{th}$ RB indicates an RB numbered X, for example, a $9^{th}$ RB indicates an RB numbered 9.

In another example, the terminal device and the network device determine, in advance, PRB grid structures corresponding to different subcarrier spacings. Therefore, after determining, based on the foregoing method, the location of the first subcarrier corresponding to the minimum subcarrier spacing, the terminal device determines that a location of a second subcarrier corresponding to a second subcarrier spacing is the same as that of the first subcarrier, where the second subcarrier spacing is a subcarrier spacing other than the subcarrier spacing corresponding to the first subcarrier. The location should be understood as a same physical location, and the number of the first subcarrier may be different. In this solution, when the terminal device sends signals having different subcarrier spacings, a location of a carrier frequency or a radio frequency local oscillator can be aligned with the location of the first subcarrier, to obtain relatively desirable radio frequency performance.

In another example, in the method, for a given bandwidth, the location of the first subcarrier is determined based on a maximum supported subcarrier spacing. It should be understood that the maximum supported subcarrier spacing in the given bandwidth usually depends on a configuration of the network device. The network device configures one or more subcarrier spacings for the given bandwidth. Therefore, when the network device configures only one subcarrier spacing, the maximum supported subcarrier spacing in the given bandwidth is the subcarrier spacing, and when the network device configures a plurality of subcarrier spacings, the maximum supported subcarrier spacing in the given bandwidth is a maximum subcarrier spacing of the plurality of subcarrier spacings. In an example, when the network device configures only the subcarrier spacing 15 kHz for the given bandwidth, the maximum supported subcarrier spacing in the given bandwidth is 15 kHz, and when the network device configures the subcarrier spacings 15 kHz and 30 kHz for the given bandwidth, the maximum supported subcarrier spacing in the given bandwidth is 30 kHz.

For example, for the given bandwidth, a minimum subcarrier spacing $u_{min}$ (for example, 15 kHz) supported by the terminal device in the bandwidth, and a maximum subcarrier spacing $u_{max}$ (for example, 60 kHz) supported by the terminal device in the bandwidth are shown in the following Table 6.

TABLE 6

| μ | $\Delta f = 2^\mu \cdot 15$ [kHz] |
|---|---|
| 0 | 15 |
| 1 | 30 |
| 2 | 60 |
| 3 | 120 |
| 4 | 240 |
| 5 | 480 |

In Table 6, u indicates a subcarrier spacing identifier. For the subcarrier spacing corresponding to $u_{min}$, the number of the first subcarrier is obtained according to the formula 3, and specifics are as follows:

$$k=\text{floor}(N*12/2/2^{\hat{}}(u_{max}-u_{min}))*2^{\hat{}}(u_{max}-u_{min}) \quad (3).$$

N indicates a quantity of RBs corresponding to the subcarrier spacing corresponding to $u_{min}$ in the bandwidth, and floor(x) indicates rounding x down.

For another example, the number of the first subcarrier may be obtained according to the formula 4, and specifics are as follows:

$$k=\text{floor}(N*12/2/2^{\hat{}}(u_{max}-u_{min}))*2^{\hat{}}(u_{max}-u_{min})+2^{\hat{}}(u_{max}-u_{min}) \quad (4).$$

N indicates a quantity of RBs corresponding to the subcarrier spacing corresponding to $u_{min}$ in the bandwidth, and floor(x) indicates rounding x down.

Formula (4) may be further indicated as the following formula (5):

$$k=\text{ceil}(N*12/2/2^{\hat{}}(u_{max}-u_{min}))*2^{\hat{}}(u_{max}-u_{min}) \quad (5).$$

Ceil(x) indicates rounding x up.

It should be noted that the number of the first subcarrier calculated according to the formula (3) is less than a number of the center subcarrier of the bandwidth, and the number of the first subcarrier calculated according to the formula (4) is greater than the number of the center subcarrier of the bandwidth. In consideration that the first subcarriers calculated according to the formulas (3) and (4) are symmetrical to the center subcarrier of the bandwidth, a plurality of candidate subcarriers may be used as the first subcarrier. Therefore, the terminal device may select one from the plurality of candidate first subcarriers.

In consideration that a value of $2^{\hat{}}(u_{max}-u_{min})$ may be 1, 2, 4, 8, 16, or 32, the foregoing formulas may be simply summarized as formula 6:

$$k=\text{floor}(N*12/2n)*n+s \quad (\text{formula 6}).$$

In the formula, n=1, 2, 4, 8, 16, or 32, and s=0 or n. N indicates a quantity of RBs corresponding to the subcarrier spacing corresponding to $u_{min}$ in the bandwidth, and floor(x) indicates rounding x down.

In the example, for all subcarrier spacings, the location of the first subcarrier determined by the terminal device is a peak location of a subcarrier. In addition, locations of first subcarriers of different subcarrier spacings are aligned, and the location is near the center of the bandwidth. This solution can balance performance and complexity of sending a signal by the terminal device.

For another example, for a given quantity of target resource blocks, the terminal device may determine the number of the first subcarrier based on a correspondence between the number of the first subcarrier and the quantity of target resource blocks. The correspondence between the number of the first subcarrier and the quantity of target resource blocks may be shown in Table 7, or may be shown in Table 8.

TABLE 7

| Quantity of RBs | Number of an RB of a first subcarrier | Number of a first subcarrier in an RB | Offset between a first subcarrier and a center subcarrier | Number of a center subcarrier | Number of a first subcarrier in all RBs |
|---|---|---|---|---|---|
| 25 | 12 | 4 | 2 | 150 | 148 |
| 52 | 26 | 0 | 0 | 312 | 312 |
| 79 | 39 | 4 | 2 | 474 | 472 |
| 106 | 53 | 0 | 0 | 636 | 636 |
| 133 | 66 | 4 | 2 | 798 | 796 |
| 135 | 67 | 4 | 2 | 810 | 808 |
| 216 | 108 | 0 | 0 | 1296 | 1296 |
| 270 | 135 | 0 | 0 | 1620 | 1620 |
| 162 | 81 | 0 | 0 | 972 | 972 |
| 217 | 108 | 4 | 2 | 1302 | 1300 |
| 273 | 136 | 4 | 2 | 1638 | 1636 |

TABLE 8

| Quantity of RBs | Number of an RB of a first subcarrier | Number of a first subcarrier in an RB | Offset between a first subcarrier and a center subcarrier | Number of a center subcarrier | Number of a first subcarrier in all RBs |
|---|---|---|---|---|---|
| 25 | 12 | 8 | −2 | 150 | 152 |
| 52 | 26 | 0 | 0 | 312 | 312 |
| 79 | 39 | 8 | −2 | 474 | 476 |
| 106 | 53 | 0 | 0 | 636 | 636 |
| 133 | 66 | 8 | −2 | 798 | 800 |
| 135 | 67 | 8 | −2 | 810 | 812 |
| 216 | 108 | 0 | 0 | 1296 | 1296 |
| 270 | 135 | 0 | 0 | 1620 | 1620 |
| 162 | 81 | 0 | 0 | 972 | 972 |
| 217 | 108 | 8 | −2 | 1302 | 1304 |
| 273 | 136 | 8 | −2 | 1638 | 1640 |

In the example, for all subcarrier spacings, the location of the first subcarrier determined by the terminal device is a peak location of a subcarrier. In addition, locations of first subcarriers of different subcarrier spacings may be aligned, and the location is near the center of the bandwidth. This solution can balance performance and complexity of sending a signal by the terminal device.

It should be particularly noted that, Table 7 or Table 8 is only an example used to understand this embodiment of the present disclosure. In an aspect, the content included in Table 7 or Table 8 includes but is not limited to the foregoing content. In another aspect, the correspondence between the number of the first subcarrier and the quantity of target resource blocks in Table 7 or Table 8 may further have another representation form, and the another representation form falls within the protection scope of the present disclosure as long as the correspondence between the number of the first subcarrier and the quantity of target resource blocks can be indicated. Details are not described herein.

It should be noted that a carrier frequency location at which the terminal device sends the uplink signal may be the same as the location of the first subcarrier determined by the terminal device. Therefore, that the terminal device determines the location information of the first subcarrier may be understood as that the terminal device determines the carrier frequency location at which the uplink signal is sent. A radio frequency local oscillator location at which the terminal device sends the uplink signal may also be the same as the location of the first subcarrier determined by the terminal device. Therefore, that the terminal device determines the location information of the first subcarrier may be understood as that the terminal device determines the radio frequency local oscillator location at which the uplink signal is sent. A channel raster location at which the terminal device sends the uplink signal may also be the same as the location of the first subcarrier determined by the terminal device. Therefore, that the terminal device determines the location information of the first subcarrier may be understood as that the terminal device determines the channel raster location at which the uplink signal is sent.

Step 202: The terminal device determines the uplink signal based on the location information of the first subcarrier.

Step 203: The terminal device sends the uplink signal to the network device.

Step 204: The network device determines the location information of the first subcarrier based on the first parameter, where the first parameter includes at least one of the following: the subcarrier spacing, the target bandwidth, or the quantity of target resource blocks.

Figure 2A:
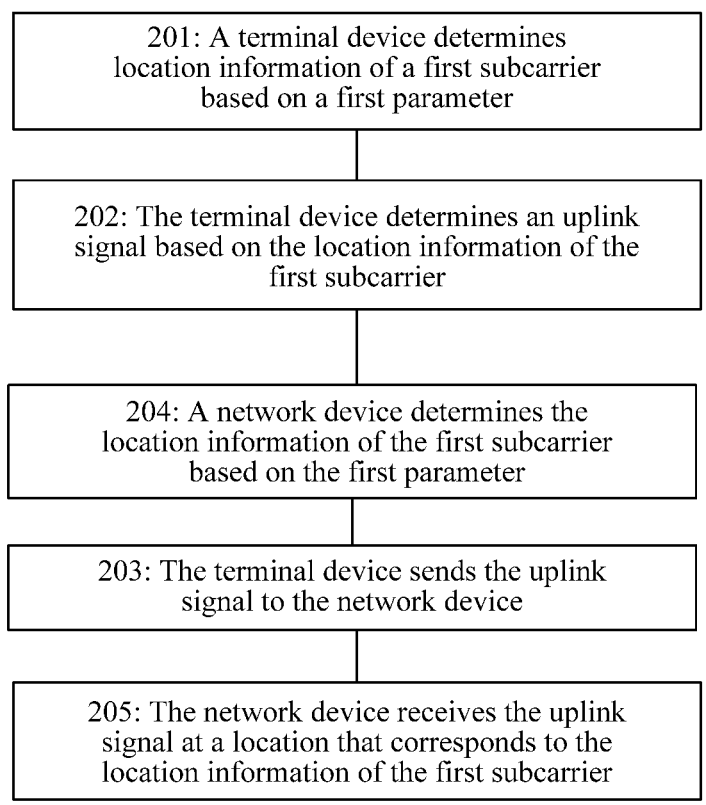
Figure 2B:
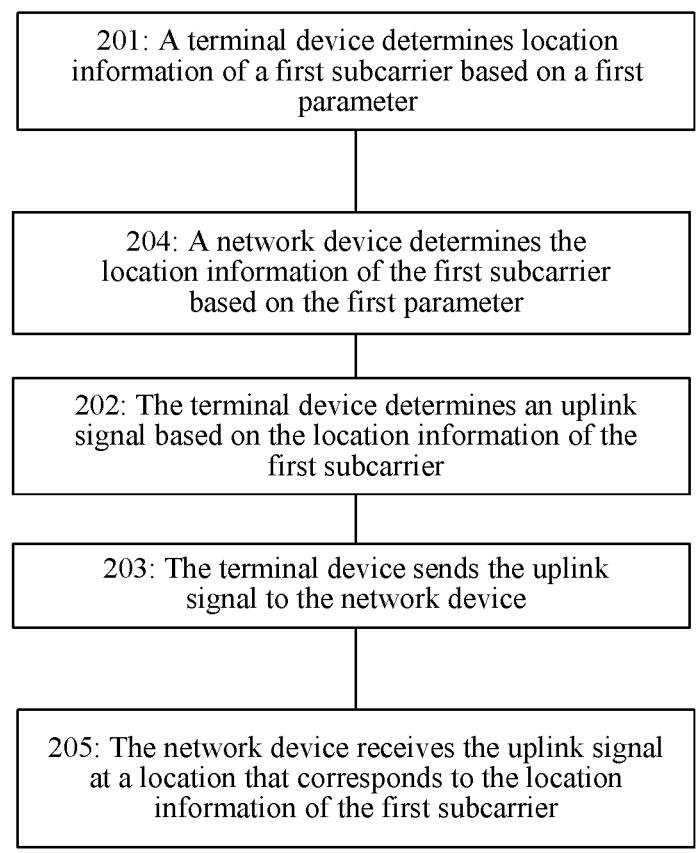
Figure 2C:
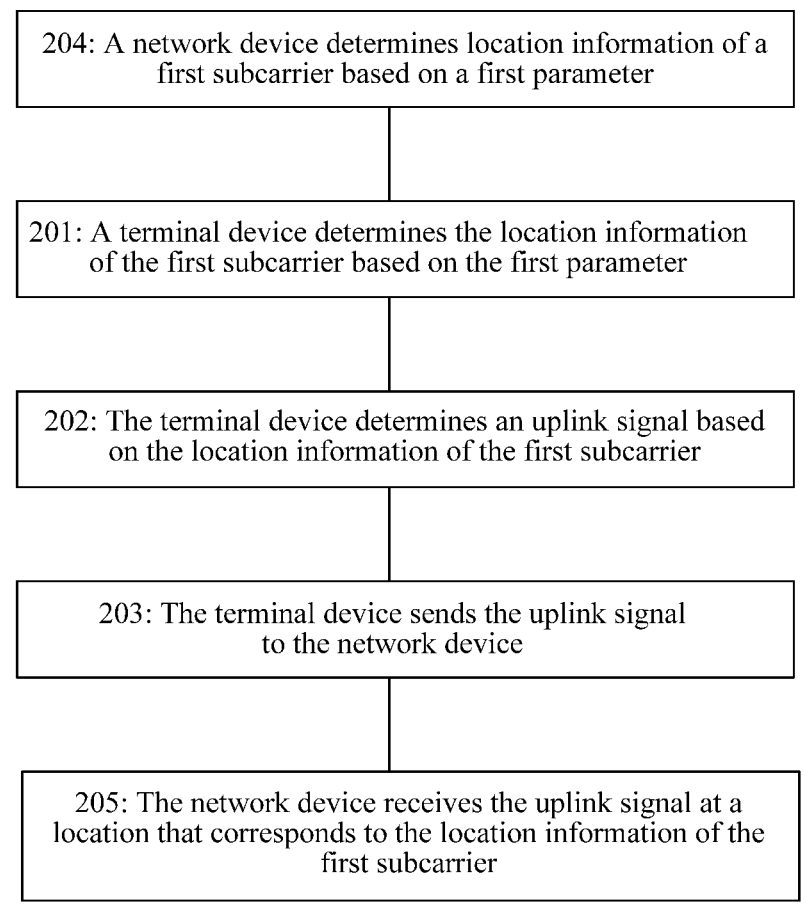

It should be noted that a sequence of step 204 and steps 201 to 203 is not limited. For example, as shown in FIG. 2*c*, step 204 may be performed before step 201. Alternatively, as shown in FIG. 2*b*, step 204 may be performed after step 201 and before step 202. Alternatively, as shown in FIG. 2*a*, step 204 may be performed before step 203. This is not specifically limited in this embodiment of the present disclosure.

Specifically, for detailed features of the first subcarrier, the location information of the first subcarrier, the first parameter, the subcarrier spacing, the target bandwidth, or the target resource block, refer to detailed features in step 201. Details are not described one by one herein again.

In an example, the first subcarrier may be a direct current subcarrier. For example, the direct current subcarrier is a subcarrier whose frequency is 0 in a baseband signal generated by the terminal device, and the frequency should be understood as a baseband frequency.

In an example, the target bandwidth may be the sending bandwidth of the terminal device. For example, the target bandwidth may be a bandwidth used to send uplink information, for example, 5 MHz, 10 MHz, or 20 MHz.

In an example, the target bandwidth may be a maximum sending bandwidth that can be supported by the terminal device.

In an example, the quantity of target resource blocks includes: a quantity of resource blocks corresponding to the maximum sending bandwidth supported by the network device; or a quantity of resource blocks corresponding to the sending bandwidth of the network device.

In an example, if the first parameter is the target bandwidth and the subcarrier spacing, the network device determines the location information of the first subcarrier based on the target bandwidth and the subcarrier spacing. For a specific determining process, refer to the process of determining, by the terminal device, the location information of the first subcarrier based on the target bandwidth and the subcarrier spacing in step 201. Details are not described herein again.

In another example, if the first parameter is the quantity of target resource blocks, the network device determines the location information of the first subcarrier based on the quantity of target resource blocks. For a specific determining process, refer to the process of determining, by the terminal device, the location information of the first subcarrier based on the quantity of target resource blocks in step 201. Details are not described herein again.

In an example, the first subcarrier is a center subcarrier corresponding to the target bandwidth and the subcarrier spacing.

In an example, the location information of the first subcarrier includes a number of the first subcarrier. For example, the number of the first subcarrier is a multiple of 6 and is not a multiple of 12, or is a multiple of 12. For example, the location information of the first subcarrier may further have other representation forms than a number. The other representation forms are not listed one by one herein and all fall within the protection scope of the present disclosure as long as the other representation forms can indicate the location information of the first subcarrier.

Step 205: The network device receives the uplink signal at a location that corresponds to the location information of the first subcarrier.

This solution can ensure receiving performance of receiving, by the network device, the uplink signal sent by the terminal device, and avoid additional signaling overheads sent by the terminal device to the network device to indicate a direct current subcarrier.

FIG. 8 shows another implementation according to an embodiment of this application. Some descriptions in this embodiment are the same as or similar to those in the foregoing embodiments, and the following mainly describes some differences. This embodiment includes the following steps.

Step 301: A network device determines location information of a first subcarrier based on a first parameter, where the first parameter includes at least one of the following: a subcarrier spacing, a target bandwidth, or a quantity of target resource blocks.

Specifically, for detailed features of the first subcarrier, the location information of the first subcarrier, the first parameter, the subcarrier spacing, the target bandwidth, or the target resource block, refer to detailed features in step 201. Details are not described one by one herein again.

Specifically, for the obtaining, by the network device, the location information of the first subcarrier based on the target bandwidth and the subcarrier spacing, refer to the obtaining process in step 201. In this solution, when the network device sends signals having different subcarrier spacings, a location of a carrier frequency or a radio frequency local oscillator can be aligned with a location of the first subcarrier, to obtain better radio frequency performance.

Specifically, for the obtaining, by the network device, the location information of the first subcarrier based on the quantity of target resource blocks, refer to the obtaining process in step 201. In this solution, for any value of a subcarrier spacing of a sending bandwidth, the first subcarrier determined by the network device is a center subcarrier of the sending bandwidth, so that when the network device sends signals having different subcarrier spacings, a location of a carrier frequency or a radio frequency local oscillator can be aligned with a location of the first subcarrier, to obtain relatively desirable radio frequency performance.

Specifically, for a given bandwidth, the location of the first subcarrier is determined based on a maximum supported subcarrier spacing, and for a specific determining process, refer to step 201.

Step 302: The network device determines a downlink signal based on the location information of the first subcarrier.

Step 303: The network device sends the downlink signal to a terminal device.

Step 304: The terminal device determines the location information of the first subcarrier based on the first parameter, where the first parameter includes at least one of the following: the subcarrier spacing, the target bandwidth, or the quantity of target resource blocks.

Figure 8A:
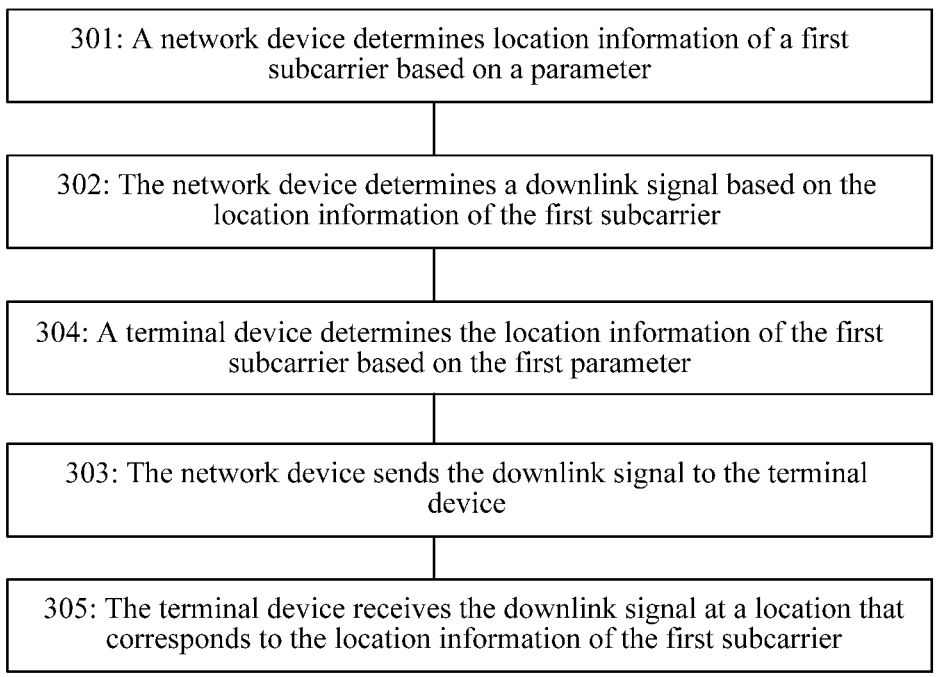
Figure 8B:
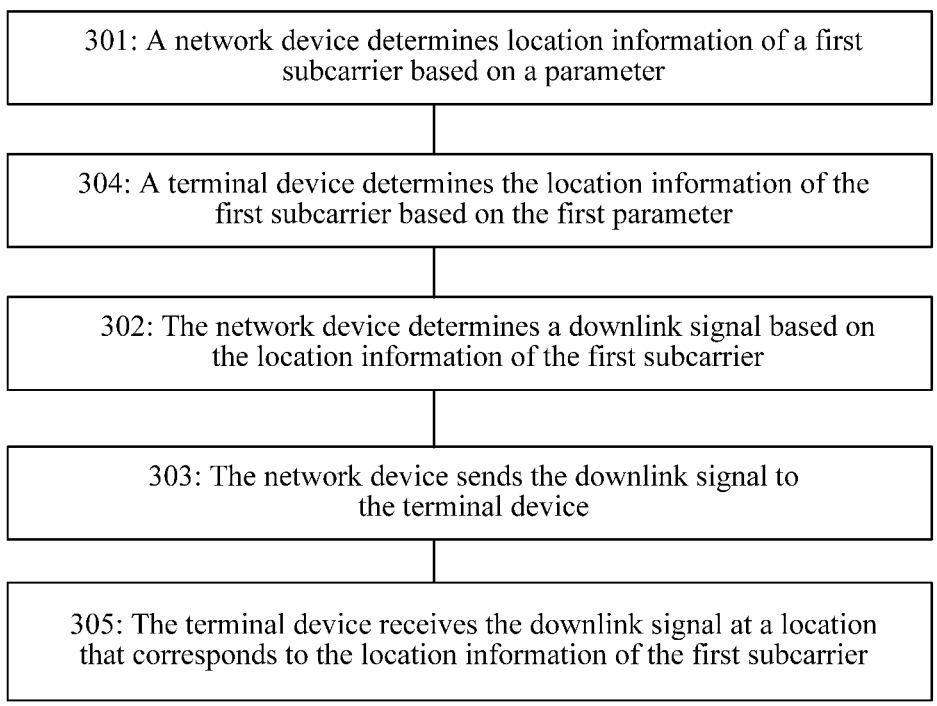
Figure 8C:
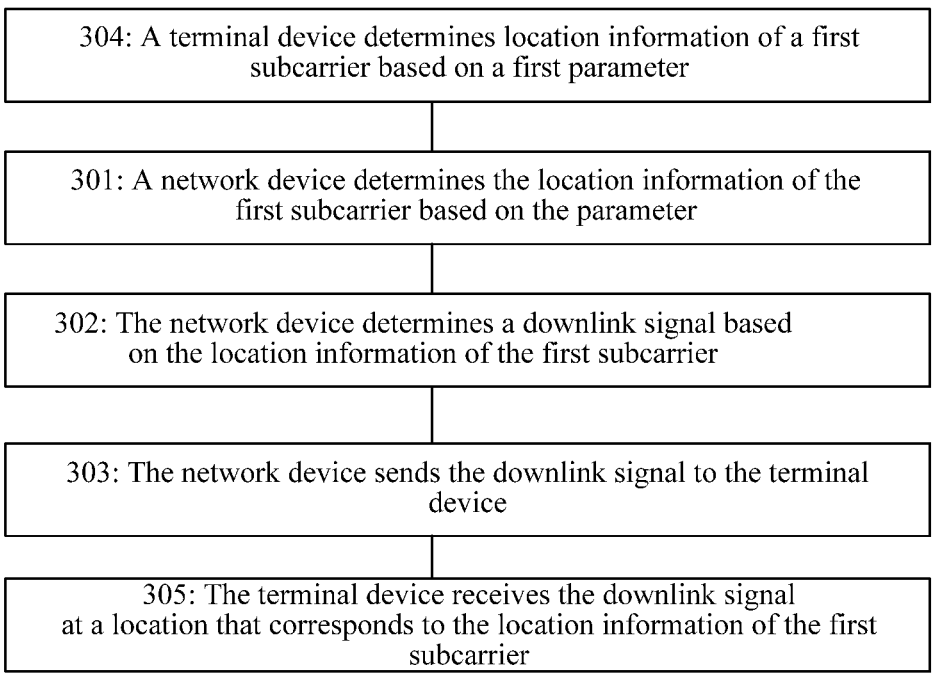

It should be noted that a sequence of step 304 and steps 301 to 303 is not limited. For example, as shown in FIG. 8c, step 304 may be performed before step 301. Alternatively, as shown in FIG. 8b, step 304 may be performed after step 301 and before step 302. Alternatively, as shown in FIG. 8a, step 304 may be performed before step 303. This is not specifically limited in this embodiment of the present disclosure.

Step 305: The terminal device receives the downlink signal at a location that corresponds to the location information of the first subcarrier.

It should be noted that a carrier frequency location at which the network device sends the downlink signal may be the same as the location of the first subcarrier determined by the network device. Therefore, that the network device determines the location information of the first subcarrier may be understood as that the network device determines the carrier frequency location at which the downlink signal is sent. A radio frequency local oscillator location at which the network device sends the downlink signal may also be the same as the location of the first subcarrier determined by the network device. Therefore, that the network device determines the location information of the first subcarrier may be understood as that the network device determines the radio frequency local oscillator location at which the downlink signal is sent. A channel raster location at which the network device sends the downlink signal may also be the same as the location of the first subcarrier determined by the network device. Therefore, that the network device determines the location information of the first subcarrier may be understood as that the network device determines the channel raster location at which the downlink signal is sent.

This solution can ensure receiving performance of receiving, by the terminal device, the downlink signal sent by the network device, and avoid additional signaling overheads sent by the network device to the terminal device to indicate a direct current subcarrier.

Figure 9:
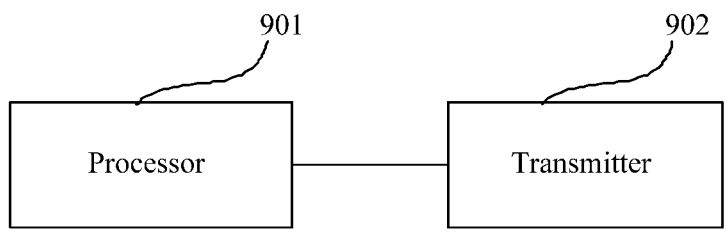
FIG. 9 is a schematic structural diagram of a terminal device according to an embodiment of this application.

As shown in FIG. 9, an embodiment of this application further provides a terminal device configured to perform actions and functions of the terminal device in the embodiment shown in FIG. 2. The terminal device includes a processor 901 and a transmitter 902.

The processor 901 is configured to: determine location information of a first subcarrier based on a first parameter, and determine an uplink signal based on the location information of the first subcarrier, where the first parameter includes at least one of the following: a subcarrier spacing, a target bandwidth, or a quantity of target resource blocks.

The transmitter 902 is configured to send the uplink signal determined by the processor 901 to a network device.

Specifically, for detailed features of the first subcarrier, the location information of the first subcarrier, the first parameter, the subcarrier spacing, the target bandwidth, or the target resource block, refer to detailed features in step 201. Details are not described one by one herein again.

Specifically, the processor 901 is specifically configured to obtain the location information of the first subcarrier based on the target bandwidth and the subcarrier spacing. For a specific obtaining process, refer to the obtaining example described in step 201.

Specifically, the processor 901 is specifically configured to obtain the location information of the first subcarrier based on the quantity of target resource blocks. For a specific obtaining process, refer to the obtaining example described in step 201.

Specifically, the processor 901 is specifically configured to determine a location of the first subcarrier based on a maximum supported subcarrier spacing for a given bandwidth. For a specific obtaining process, refer to the obtaining example described in step 201.

In an example, the processor is further configured to determine that a location of a second subcarrier corresponding to a second subcarrier spacing is the same as that of the first subcarrier, where the second subcarrier spacing is a subcarrier spacing other than a subcarrier spacing corresponding to the first subcarrier.

It should be particularly noted that the processor may further be a processing module and the transmitter may further be a transmitter in this embodiment.

For beneficial effects of this embodiment, refer to those of the corresponding method embodiment. Details are not described herein again.

Figure 10:
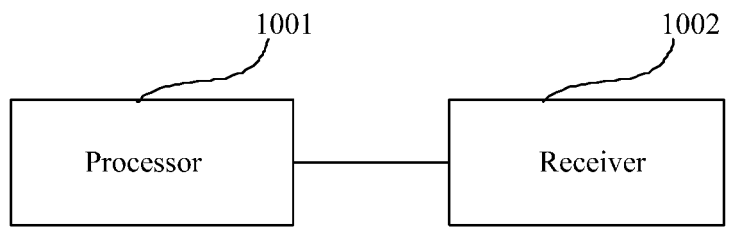
FIG. 10 is a schematic structural diagram of a network device according to an embodiment of this application.

As shown in FIG. 10, an embodiment of this application further provides a network device, configured to perform actions and functions of the network device shown in FIG. 2. The network device includes a processor 1001 and a receiver 1002.

The processor 1001 is configured to determine location information of a first subcarrier based on a first parameter, where the first parameter includes at least one of the following: a subcarrier spacing, a target bandwidth, or a quantity of target resource blocks.

The receiver 1002 is configured to receive an uplink signal at a location that corresponds to the location information of the first subcarrier determined by the processor.

Specifically, for detailed features of the first subcarrier, the location information of the first subcarrier, the first parameter, the subcarrier spacing, the target bandwidth, or the target resource block, refer to detailed features in step 201. Details are not described one by one herein again.

Specifically, the processor 1001 is specifically configured to obtain the location information of the first subcarrier based on the target bandwidth and the subcarrier spacing. For a specific obtaining process, refer to the obtaining example described in step 201.

Specifically, the processor 1001 is specifically configured to obtain the location information of the first subcarrier based on the quantity of target resource blocks. For a specific obtaining process, refer to the obtaining example described in step 201.

Specifically, the processor 1001 is specifically configured to determine the location of the first subcarrier based on a maximum supported subcarrier spacing for a given bandwidth. For a specific determining process, refer to the example described in step 201.

It should be particularly noted that the processor may further be a processing module and the receiver may further be a receiving module in this embodiment.

For beneficial effects of this embodiment, refer to those of the corresponding method embodiment. Details are not described herein again.

Figure 11:
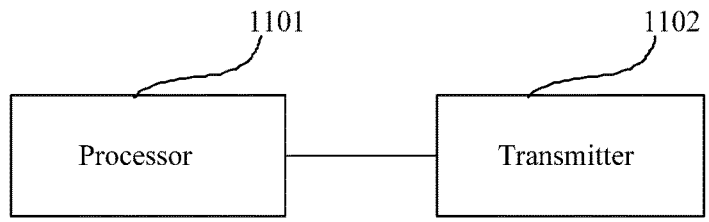
FIG. 11 is a schematic structural diagram of another network device according to an embodiment of this application.

As shown in FIG. 11, an embodiment of this application further provides a network device, configured to perform actions and functions of the network device shown in FIG. 8. The network device includes a processor 1101 and a transmitter 1102.

The processor 1101 is configured to: determine location information of a first subcarrier based on a first parameter, and determine an downlink signal based on the location information of the first subcarrier, where the first parameter includes at least one of the following: a subcarrier spacing, a target bandwidth, or a quantity of target resource blocks.

The transmitter 1102 is configured to send the downlink signal determined by the processor to a terminal device.

Specifically, for detailed features of the first subcarrier, the location information of the first subcarrier, the first parameter, the subcarrier spacing, the target bandwidth, or the target resource block, refer to detailed features in step 201. Details are not described one by one herein again.

Specifically, the processor 1101 is specifically configured to obtain the location information of the first subcarrier based on the target bandwidth and the subcarrier spacing. For a specific obtaining process, refer to the obtaining example described in step 201.

Specifically, the processor 1101 is specifically configured to obtain the location information of the first subcarrier based on the quantity of target resource blocks. For a specific obtaining process, refer to the obtaining example described in step 201.

Specifically, the processor 1101 is specifically configured to determine a location of the first subcarrier based on a maximum supported subcarrier spacing for a given bandwidth. For a specific determining process, refer to the example described in step 201.

It should be particularly noted that the processor may further be a processing module and the transmitter may further be a transmitter in this embodiment.

For beneficial effects of this embodiment, refer to those of the corresponding method embodiment. Details are not described herein again.

Figure 12:
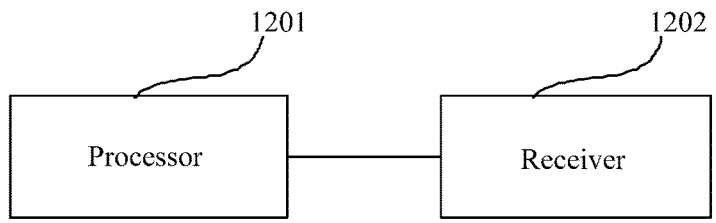
FIG. 12 is a schematic structural diagram of another terminal device according to an embodiment of this application.

As shown in FIG. 12, an embodiment of this application further provides a terminal device, configured to perform actions and functions of the terminal device shown in FIG. 8. The terminal device includes a processor 1201 and a receiver 1202.

The processor 1201 is configured to determine location information of a first subcarrier based on a first parameter, where the first parameter includes at least one of the following: a subcarrier spacing, a target bandwidth, or a quantity of target resource blocks.

The receiver 1202 is configured to receive a downlink signal at a location of the first subcarrier that corresponds to the location information of the first subcarrier determined by the processor 1201.

Specifically, for detailed features of the first subcarrier, the location information of the first subcarrier, the first parameter, the subcarrier spacing, the target bandwidth, or the target resource block, refer to detailed features in step 201. Details are not described one by one herein again.

Specifically, the processor 1201 is specifically configured to obtain the location information of the first subcarrier based on the target bandwidth and the subcarrier spacing. For a specific obtaining process, refer to the obtaining example described in step 201.

Specifically, the processor 1201 is specifically configured to obtain the location information of the first subcarrier based on the quantity of target resource blocks. For a specific obtaining process, refer to the obtaining example described in step 201.

Specifically, the processor 1201 is specifically configured to determine the location of the first subcarrier based on a maximum supported subcarrier spacing for a given bandwidth. For a specific determining process, refer to the example described in step 201.

It should be particularly noted that the processor may further be a processing module and the receiver may further be a receiving module in this embodiment.

For beneficial effects of this embodiment, refer to those of the corresponding method embodiment. Details are not described herein again.

Figure 13:
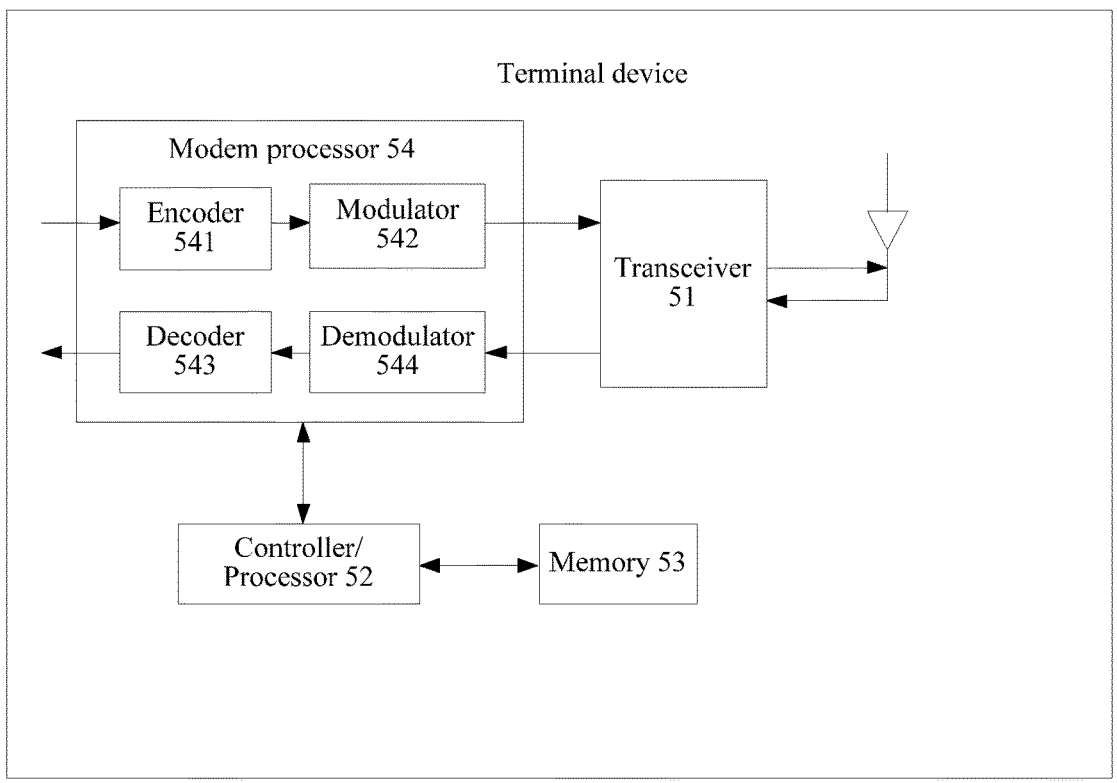
FIG. 13 is a schematic structural diagram of another terminal device according to an embodiment of this application.

FIG. 13 is a simplified schematic diagram of a possible design structure of a communications device such as a terminal device according to an embodiment of this application. The communications device may be the terminal device shown in FIG. 9. The terminal device includes a transceiver 51, a controller/a processor 52, and further may include a memory 53 and a modem processor 54.

The transceiver 51 adjusts (for example, through analog conversion, filtering, amplification, and up-conversion) an output sample and generates an uplink signal. The uplink signal is transmitted to the network device in the foregoing embodiment through an antenna. On a downlink, an antenna receives a downlink signal transmitted by the base station in the foregoing embodiments. The transceiver 51 adjusts (for example, through filtering, amplification, down-conversion, and digitization) a signal received through the antenna and provides an input sample. In the modem processor 54, an encoder 541 receives service data and a signaling message that are to be sent on an uplink, and processes (for example, formats, encodes, and interleaves) the service data and the signaling message. A modulator 542 further processes (for example, performs symbol mapping on and modulates) encoded service data and an encoded signaling message, and provides an output sample. A decoder 543 processes (for example, de-interleaves and decodes) the symbol estimation and provides decoded data and a decoded signaling message that are sent to the terminal device. A demodulator 544 processes (for example, demodulates) the input sample and provides a symbol estimation. The encoder 541, the modulator 542, the decoder 543, and the demodulator 544 may be implemented by the composite modem processor 54. The units perform processing based on a wireless technology (for example, access technologies of LTE and other evolved systems) used by a radio access network.

The controller/the processor 52 controls and manages actions of the communications device such as the terminal device, and is configured to perform processing by the terminal device in the foregoing embodiment. The terminal device receives first information sent by the network device, and determines an uplink subcarrier mapping manner based on the first information. In an example, the controller/the processor 52 may be configured to support the terminal device in performing the content of the terminal device in FIG. 1 or FIG. 4. The memory 53 is configured to store program code and data used by the terminal device.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (solid state disk, SSD for short)), or the like.

Although the embodiments of the present disclosure are illustrated and described with reference to some implementations of this application, a person of ordinary skill in the art should understand that various changes may be made to the form and details in this application without departing from the scope of this application.

What is claimed is:

1. A communication method, comprising:
determining, by a communications apparatus, a first subcarrier, an offset being between the first subcarrier and a center subcarrier of target resource blocks in a target bandwidth, the offset being related to a subcarrier spacing, the subcarrier spacing corresponding to the first subcarrier being a maximum subcarrier spacing of a carrier, the carrier comprising the target bandwidth, and the first subcarrier satisfying:

$$k = \text{floor}(N*12/2/2^{\wedge}(u_{max}-u_{min}))*2^{\wedge}(u_{max}-u_{min})+2^{\wedge}(u_{max}-u_{min})$$

where $u_{min}$ is a minimum subcarrier spacing supported by the communications apparatus in the target bandwidth, $u_{max}$ is a maximum subcarrier spacing supported by the communications apparatus in the target bandwidth, N indicates a quantity of resource blocks corresponding to the minimum subcarrier spacing $u_{min}$ in the target bandwidth, and floor(x) indicates rounding x down;
determining, by the communications apparatus, a signal, a frequency location of the first subcarrier being the same as a carrier frequency location of the signal; and
transmitting, by the communications apparatus, the signal.

2. The method according to claim 1, wherein the offset is a difference value between a first index of the first subcarrier and a second index of the center subcarrier.

3. The method according to claim 1, wherein determining the first subcarrier comprises:
determining the first subcarrier according to a quantity of the target resource blocks and the offset.

4. The method according to claim 1, wherein the offset is further related to a quantity of the target resource blocks.

5. The method according to claim 1, wherein determining the first subcarrier comprises:
determining a first subcarrier index, the offset being a difference value between a first index of the first subcarrier and a second index of the center subcarrier.

6. The method according to claim 5, wherein the offset being related to the subcarrier spacing comprises:
the offset being related to an identity of the subcarrier spacing.

7. The method according to claim 1, wherein the carrier frequency location of the signal is the same as a first carrier frequency location of the center subcarrier of the target resource blocks in the target bandwidth.

8. The method according to claim 1, wherein the target bandwidth is configured by a network device.

9. A communication apparatus comprising:
a processor, configured to:
determine a first subcarrier, wherein an offset is between the first subcarrier and a center subcarrier of target resource blocks in a target bandwidth, wherein the subcarrier spacing corresponding to the first subcarrier is a maximum subcarrier spacing of a carrier, wherein the offset is related to a subcarrier spacing, and wherein the first subcarrier satisfies:

$$k=\text{floor}(N*12/2/2^{\wedge}(u_{max}-u_{min}))*2^{\wedge}(u_{max}-u_{min})+2^{\wedge}(u_{max}-u_{min})$$

wherein $u_{min}$ is a minimum subcarrier spacing supported by the apparatus in the target bandwidth, $u_{max}$ is a maximum subcarrier spacing supported by the apparatus in the target bandwidth, N indicates a quantity of resource blocks corresponding to the minimum subcarrier spacing $u_{min}$ in the target bandwidth, and floor(x) indicates rounding x down;
determine a signal, wherein a frequency location of the first subcarrier is the same as a carrier frequency location of the signal; and
transmit the signal; and
a memory coupled to the processor.

10. The apparatus according to claim 9, wherein the offset is a difference value between a first index of the first subcarrier and a second index of the center subcarrier.

11. The apparatus according to claim 9, wherein the processor is configured to:
determine the first subcarrier according to a quantity of the target resource blocks and the offset.

12. The apparatus according to claim 9, wherein the offset is further related to a quantity of the target resource blocks.

13. The apparatus according to claim 9, wherein the processor is configured to:
determine a first subcarrier index, wherein the offset is a difference value between a first index of the first subcarrier and a second index of the center subcarrier.

14. The apparatus according to claim 13, wherein the offset being related to the subcarrier spacing comprises:
the offset being related to an identity of the subcarrier spacing.

15. The apparatus according to claim 9, wherein the subcarrier spacing corresponding to the first subcarrier is a maximum subcarrier spacing of a carrier, and the carrier comprises the target bandwidth.

16. The apparatus according to claim 9, wherein the target bandwidth is configured by a network device.

17. A non-transitory computer readable medium storing program codes for use by a user equipment device (UE), wherein the program codes comprise instructions for:
determining a first subcarrier, wherein an offset is between the first subcarrier and a center subcarrier of target resource blocks in a target bandwidth, wherein the subcarrier spacing corresponding to the first subcarrier is a maximum subcarrier spacing of a carrier, wherein the offset is related to a subcarrier spacing, and wherein the first subcarrier satisfies:

$$k=\text{floor}(N*12/2/2^{\wedge}(u_{max}-u_{min}))*2^{\wedge}(u_{max}-u_{min})+2^{\wedge}(u_{max}-u_{min})$$

wherein $u_{min}$ is a minimum subcarrier spacing supported by the UE in the target bandwidth, $u_{max}$ is a maximum subcarrier spacing supported by the UE in the target bandwidth, N indicates a quantity of resource blocks corresponding to the minimum subcarrier spacing $u_{min}$ in the target bandwidth, and floor (x) indicates rounding x down;
determining a signal, wherein a frequency location of the first subcarrier is the same as a carrier frequency location of the signal; and
transmitting the signal.

18. The non-transitory computer readable medium according to claim 17, wherein the offset is a difference value between a first index of the first subcarrier and a second index of the center subcarrier.

19. The non-transitory computer readable medium according to claim 17, wherein determining the first subcarrier comprises:
determining the first subcarrier according to a quantity of the target resource blocks and the offset.

20. The non-transitory computer readable medium according to claim 17, wherein the offset is further related to a quantity of the target resource blocks.

21. The non-transitory computer readable medium according to claim 17, wherein determining the first subcarrier comprises:
determining a first subcarrier index, wherein the offset is a difference value between a first index of the first subcarrier and a second index of the center subcarrier.

22. The non-transitory computer readable medium according to claim 21, wherein the offset being related to the subcarrier spacing comprises:
the offset being related to an identity of the subcarrier spacing.

* * * * *